(12) United States Patent
Weaver et al.

(10) Patent No.: US 11,078,426 B2
(45) Date of Patent: *Aug. 3, 2021

(54) METHODS, SYSTEMS, AND DEVICES FOR LIQUID HYDROCARBON FUEL PRODUCTION, HYDROCARBON CHEMICAL PRODUCTION, AND AEROSOL CAPTURE

(71) Applicant: Proton Power, Inc., Lenoir City, TN (US)

(72) Inventors: Samuel C. Weaver, Knoxville, TN (US); Daniel L. Hensley, Knoxville, TN (US); Samuel P. Weaver, Boulder, CO (US); Daniel C. Weaver, Boulder, CO (US); Lee S. Smith, Boulder, CO (US)

(73) Assignee: Proton Power, Inc., Lenoir City, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/792,441

(22) Filed: Feb. 17, 2020

(65) Prior Publication Data

US 2020/0354635 A1     Nov. 12, 2020

Related U.S. Application Data

(63) Continuation of application No. 14/593,429, filed on Jan. 9, 2015, now Pat. No. 10,563,128.
(Continued)

(51) Int. Cl.
*C10G 1/02* (2006.01)
*C10B 53/02* (2006.01)
(Continued)

(52) U.S. Cl.
CPC ............... *C10G 1/02* (2013.01); *B01D 45/08* (2013.01); *B01D 47/02* (2013.01); *B01D 50/004* (2013.01);
(Continued)

(58) Field of Classification Search
CPC ... C10G 1/02; C10G 3/40; C10G 1/06; C10G 1/002; C10G 1/00; C10G 2300/1011;
(Continued)

(56) References Cited

U.S. PATENT DOCUMENTS 4,324,643 A   4/1982   Durai-Swamy
4,375,402 A   3/1983   Durai-Swamy
(Continued)

FOREIGN PATENT DOCUMENTS

CN   201896159   7/2011
DE     3627307   2/1988
(Continued)

OTHER PUBLICATIONS

Zanzi, R., et al., "Rapid high-temperature pyrolysis of biomass in a free-fall reactor," Fuel, vol. 75, Issue 5, 1996, pp. 545-550.
(Continued)

*Primary Examiner* — Ali Z Fadhel
(74) *Attorney, Agent, or Firm* — Wilson Patent Law, LLC

(57) ABSTRACT

Methods, systems, and devices for liquid hydrocarbon fuel production, hydrocarbon chemical production, and aerosol capture are provided. For example, a carbon-oxygen-hydrogen (C—O—H) compound may be heated to a temperature of at least 800 degrees Celsius such that the C—O—H compound reacts through a non-oxidation reaction to generate at least a hydrocarbon compound that may be at least a component of a liquid hydrocarbon fuel or a hydrocarbon chemical. The liquid hydrocarbon fuel may be a liquid when at a temperature of 20 degrees Celsius. The C—O—H
(Continued)

Figure 1B:
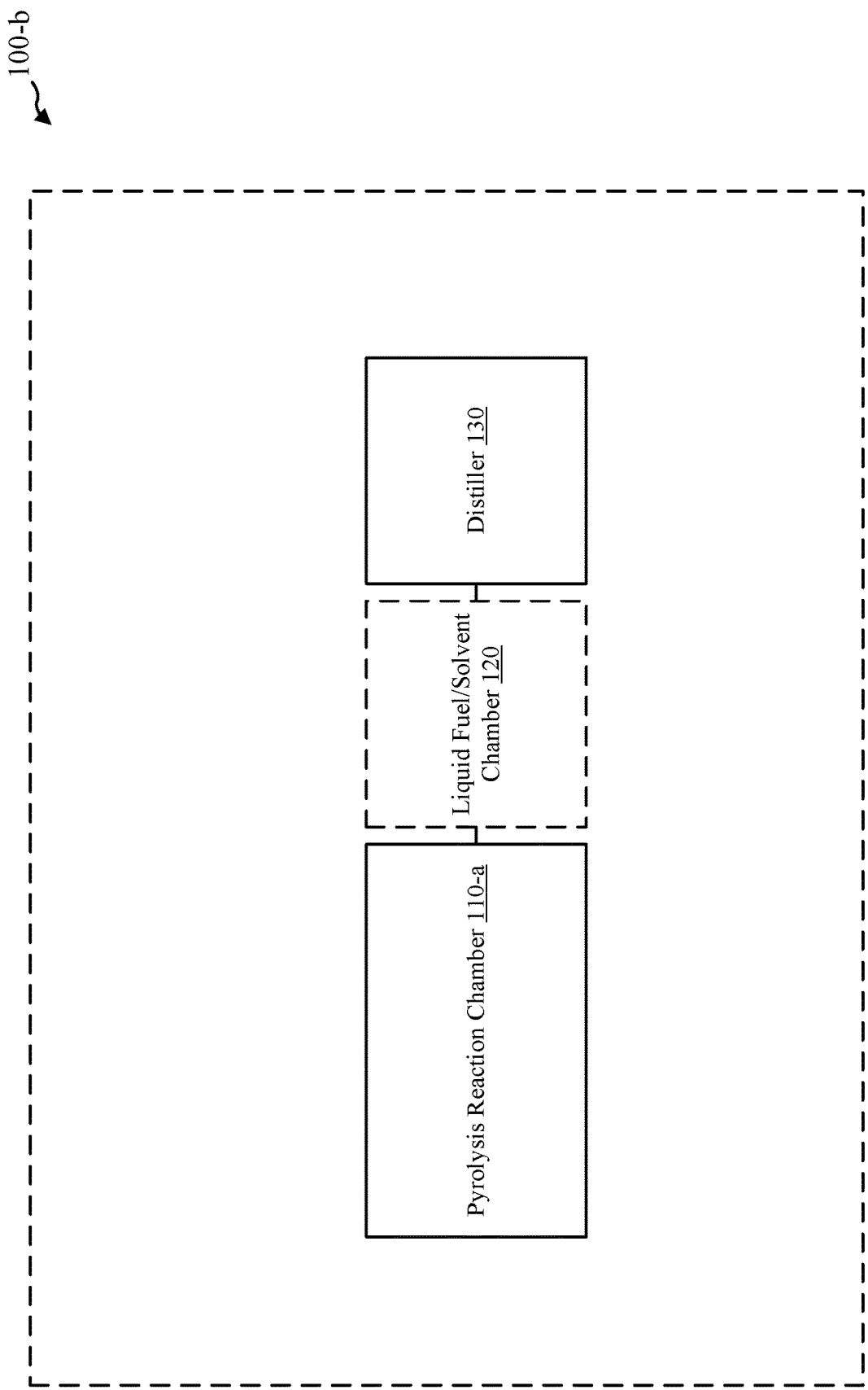

compound may include biomass. In some cases, the hydrocarbon compound produced through the non-oxidation reaction includes a hydrocarbon aerosol form as the hydrocarbon compound at least as it is produced or cools. Some embodiments include aerosol capture methods, systems, and devices, which may include passing a hydrocarbon aerosol form through a material in a liquid phase in order to gather the aerosol material.

18 Claims, 23 Drawing Sheets

Related U.S. Application Data

(60) Provisional application No. 61/988,954, filed on May 6, 2014, provisional application No. 61/970,444, filed on Mar. 26, 2014, provisional application No. 61/925,801, filed on Jan. 10, 2014.

(51) Int. Cl.
| | |
|---|---|
| *C10B 53/00* | (2006.01) |
| *C10L 1/04* | (2006.01) |
| *C10B 47/06* | (2006.01) |
| *C10B 47/44* | (2006.01) |
| *C10G 3/00* | (2006.01) |
| *C10G 1/00* | (2006.01) |
| *B01D 45/08* | (2006.01) |
| *B01D 47/02* | (2006.01) |
| *B01D 50/00* | (2006.01) |
| *B01D 53/14* | (2006.01) |
| *C10G 1/06* | (2006.01) |
| *C10B 1/02* | (2006.01) |
| *C10B 7/10* | (2006.01) |
| *C10L 1/06* | (2006.01) |
| *C10L 1/08* | (2006.01) |

(52) U.S. Cl.
CPC ..... *B01D 53/1412* (2013.01); *B01D 53/1418* (2013.01); *B01D 53/1425* (2013.01); *B01D 53/1487* (2013.01); *B01D 53/1493* (2013.01); *C10B 1/02* (2013.01); *C10B 7/10* (2013.01); *C10B 47/06* (2013.01); *C10B 47/44* (2013.01); *C10B 53/00* (2013.01); *C10B 53/02* (2013.01); *C10G 1/00* (2013.01); *C10G 1/002* (2013.01); *C10G 1/06* (2013.01); *C10G 3/40* (2013.01); *C10L 1/04* (2013.01); *C10L 1/06* (2013.01); *C10L 1/08* (2013.01); *B01D 2252/103* (2013.01); *C10G 2300/1011* (2013.01); *C10G 2400/02* (2013.01); *C10G 2400/04* (2013.01); *C10G 2400/08* (2013.01); *C10L 2200/0469* (2013.01); *C10L 2270/023* (2013.01); *C10L 2270/026* (2013.01); *C10L 2270/04* (2013.01); *C10L 2290/02* (2013.01); *C10L 2290/06* (2013.01); *C10L 2290/08* (2013.01); *C10L 2290/24* (2013.01); *C10L 2290/543* (2013.01); *C10L 2290/544* (2013.01); *C10L 2290/547* (2013.01); *C10L 2290/56* (2013.01); *Y02E 50/10* (2013.01); *Y02P 30/20* (2015.11); *Y02T 50/678* (2013.01)

(58) Field of Classification Search
CPC ............ C10G 2400/08; C10G 2400/02; C10G 2400/04; C10B 7/10; C10B 53/02; C10B 47/06; C10B 47/44; C10B 1/02; C10B 53/00; B01D 47/02; B01D 53/1418; B01D 53/1425; B01D 45/08; B01D 53/1412; B01D 53/1493; B01D 53/1487; B01D 50/004; B01D 2252/103; C10L 1/08; C10L 1/04; C10L 1/06; C10L 2290/543; C10L 2290/544; C10L 2270/023; C10L 2290/24; C10L 2290/06; C10L 2290/02; C10L 2200/0469; C10L 2270/04; C10L 2290/56; C10L 2290/547; C10L 2270/026; C10L 2290/08; Y02T 50/678; Y02E 50/10; Y02P 30/20

See application file for complete search history.

(56) References Cited

U.S. PATENT DOCUMENTS

| | | | |
|---|---|---|---|
| 4,678,860 A | 7/1987 | Kuester | |
| 4,824,580 A | 4/1989 | Standridge | |
| 5,340,596 A | 8/1994 | Ohgake | |
| 6,284,022 B1* | 9/2001 | Sachweh | ............... B01D 47/14 |
| | | | 95/149 |
| 6,830,597 B1 | 12/2004 | Green | |
| 7,473,285 B2 | 1/2009 | Russell | |
| 8,236,173 B2 | 8/2012 | Bartek | |
| 8,541,637 B2 | 9/2013 | Babicki | |
| 9,254,461 B2 | 2/2016 | Weaver | |
| 10,144,875 B2 | 12/2018 | Weaver | |
| 2003/0000822 A1 | 1/2003 | Antonenko | |
| 2003/0056648 A1 | 3/2003 | Fornai | |
| 2006/0117959 A1* | 6/2006 | Gjertsen | ................. B04C 5/04 |
| | | | 96/316 |
| 2009/0007484 A1 | 1/2009 | Smith | |
| 2009/0064583 A1 | 3/2009 | Bronshtein | |
| 2009/0126433 A1 | 5/2009 | Piskorz | |
| 2009/0227823 A1* | 9/2009 | Huber | ...................... C10G 1/08 |
| | | | 585/324 |
| 2009/0253947 A1* | 10/2009 | Brandvoid | ............... C10L 1/08 |
| | | | 585/14 |
| 2010/0228062 A1 | 9/2010 | Babicki | |
| 2011/0314881 A1 | 12/2011 | Hatcher | |
| 2011/0315537 A1 | 12/2011 | Daugaard | |
| 2012/0101318 A1 | 4/2012 | Ramirez Corredores | |
| 2012/0121492 A1 | 5/2012 | Schaub | |
| 2012/0167452 A1 | 7/2012 | Platon | |
| 2012/0209041 A1 | 8/2012 | Hanks | |
| 2012/0266530 A1* | 10/2012 | Ellis | ......................... C10L 9/10 |
| | | | 44/500 |
| 2013/0180489 A1 | 7/2013 | Reeh | |
| 2013/0214207 A1 | 8/2013 | Gharda | |
| 2013/0219773 A1 | 8/2013 | Ratinen | |
| 2013/0263498 A1 | 10/2013 | Kania | |
| 2013/0327626 A1 | 12/2013 | Daugaard | |
| 2013/0327627 A1 | 12/2013 | Daugaard | |
| 2015/0203760 A1 | 7/2015 | Weaver | |
| 2015/0251125 A1 | 9/2015 | Weaver | |
| 2015/0252268 A1 | 9/2015 | Weaver | |
| 2015/0252275 A1 | 9/2015 | Weaver | |
| 2016/0222299 A1 | 8/2016 | Weaver | |

FOREIGN PATENT DOCUMENTS

| | | | |
|---|---|---|---|
| GB | 2110231 | 6/1983 | |
| JP | 54117504 | 9/1979 | |
| JP | 2003268390 | 9/2003 | |
| JP | 2009132829 | 6/2009 | |
| JP | 2009154157 | 7/2009 | |
| JP | 2012228683 | 11/2012 | |
| WO | WO2007128800 | 11/2007 | |
| WO | WO2008028169 | 3/2008 | |
| WO | WO2011097584 | 8/2011 | |
| WO | WO2011099850 | 8/2011 | |
| WO | WO-2011099850 A2 * | 8/2011 | ............... C10K 1/16 |
| WO | WO2009111026 | 9/2011 | |
| WO | WO2012097448 | 7/2012 | |

(56) References Cited

FOREIGN PATENT DOCUMENTS

| WO | WO2014046644 | 3/2014 |
|----|--------------|--------|
| WO | WO2015106176 | 7/2015 |

OTHER PUBLICATIONS

Reed, T., et al., "Wet Scrubber," Handbook of Biomass Downdraft Gasifier Engine Systems, Solar Energy Research Institute, Mar. 1988.
"Lower and Higher Heating Values of Gas, Liquid and Solid Fuels," Biomass Energy Data Book, Appendix A, 2011, p. 1.
Haynes 214 Alloy, Haynes International High-Temperature Alloys, Haynes International, Inc., 2008, pp. 1-3.
Haynes 230 Alloy, Haynes International High-Temperature Alloys, Haynes International, Inc., 2007, pp. 1-3.
Jiang, X., et al., "Upgrading Bio-oil through Emulsification with Biodiesel: Mixture Production," Energy Fuels, vol. 24, 2010, pp. 1358-1365.
Bullis, K., "Ethanol vs. Biodiesel," MIT Technology Review, Sep. 1, 2006, p. 1.
Mineral oil. (n. d.) Collins English Dictionary, 10th Edition, Retrieved Jan. 22, 2018 from Dictionary.Com website, http://www.dictionary.com/browse/mineral-oil.
Ciferno, J., et al., "Benchmarking Biomass Gasification Technologies for Fuels, Chemicals and Hydrogen, Production," U.S. Department of Energy, Jun. 2002.
Bain, R., et al., "Highlights of Biopower Technical Assessment: State of the Industry and the Technology," NREL, Apr. 2003.
Yuan, C. Industrial Antitoxic Technology, Jun. 30, 2006.
Non-Final Office Action, U.S. Appl. No. 14/593,876, dated Jul. 8, 2015, USPTO.
Notice of Allowance, U.S. Appl. No. 14/593,876, dated Nov. 6, 2015, USPTO.
Non-Final Office Action, U.S. Appl. No. 15/017,693, dated Sep. 26, 2017, USPTO.
Notice of Abandonment, U.S. Appl. No. 15/017,693, dated Apr. 2, 2018, USPTO.
Non-Final Office Action, U.S. Appl. No. 14/593,692, dated Oct. 20, 2017, USPTO.
Notice of Allowance, U.S. Appl. No. 14/593,692, dated Jul. 25, 2018, USPTO.
Non-Final Office Action, U.S. Appl. No. 14/593,429, dated Dec. 28, 2016, USPTO.
Final Office Action, U.S. Appl. No. 14/593,429, dated Sep. 21, 2017, USPTO.
Non-Final Office Action, U.S. Appl. No. 14/593,429, dated Jan. 12, 2018, USPTO.
Non-Final Office Action, U.S. Appl. No. 14/593,429, dated Nov. 14, 2018, USPTO.
Notice of Allowance, U.S. Appl. No. 14/593,429, dated Jun. 4, 2019, USPTO.
Non-Final Office Action, U.S. Appl. No. 14/593,411, dated Mar. 23, 2017, USPTO.
Final Office Action, U.S. Appl. No. 14/593,411, dated Oct. 5, 2017, USPTO.
Advisory Action, U.S. Appl. No. 14/593, 411, dated Jan. 26, 2018, USPTO.
Notice of Abandonment, U.S. Appl. No. 14/593,411, dated May 7, 2018, USPTO.
International Search Report and Written Opinion, Int'l Appl. No. PCT/US2015/010927, dated Jun. 8, 2015, ISA-USPTO.
Examination Report No. 1, Australian Appl. No. 2015204584, dated Aug. 9, 2018, IP Australia.
Examination Report No. 2, Australian Appl. No. 2015204584, dated Dec. 22, 2018, IP Australia.
Notice of Acceptance, Australian Appl. No. 2015204584, dated Mar. 29, 2019, IP Australia.
1st Examination Report, Brazilian Appl. No. BR112016015870-9, dated Sep. 4, 2019, BPTO.
2nd Examination Report, Brazilian Appl. No. BR112016015870-9, dated Nov. 23, 2020, BPTO.
Patent Examination Report 1, New Zealand Appl. No. 722367, dated Aug. 4, 2020, IPONZ.
Patent Examination Report 2, New Zealand Appl. No. 722367, dated Dec. 8, 2020, IPONZ.
1st Written Opinion, Singapore Appl. No. 11201605024Q, dated Jun. 27, 2017, IPOS.
Notice of Eligibility of Grant, Singapore Appl. No. 11201605024Q, dated Dec. 28, 2017, IPOS.
Notice to File a Reponse, Korean Appl. No. 10-2016-7021615, dated May 15, 2020, KIPO.
1st Office Action, Chinese Appl. No. 201580004130.5, dated Jun. 23, 2017, CNIPA.
2nd Office Action, Chinese Appl. No. 201580004130.5, dated Mar. 14, 2018, CNIPA.
3rd Office Action, Chinese Appl. No. 201580004130.5, dated Dec. 27, 2018, CNIPA.
Notification for Going through Patent Registration Formalities, Chinese Appl. No. 201580004130.5, dated Apr. 28, 2019, CNIPA.
Notification Regarding the Results of Substantive Examination Indonesian Appl. No. P00201605198, dated Dec. 17, 2018, DGIP.
Notification of a granted patent, Indonesian Appl. No. P00201605198, dated Mar. 12, 2019, DGIP.
Result of substantive examination, Vietnamese Appl. No. 1-2016-02952, dated Jul. 30, 2020, NOIP.
Granting Notice, Vietnamese Appl. No. 1-2016-02952, dated Feb. 26, 2021, NOIP.
Extended European Search Report and Search Opinion, European Appl. No. 15735355.8, dated Jun. 30, 2017, EPO.
1st Examination Report, European Appl. No. 15735355.8, dated Oct. 9, 2018, EPO.
2nd Examination Report, European Appl. No. 15735355.8, dated May 14, 2019, EPO.
3rd Examination Report, European Appl. No. 15735355.8, dated Mar. 3, 2020, EPO.
1st Office Action, Japanese Appl. No. JP 2016-545779, dated Feb. 26, 2019, JPO.
Decision of Refusal, Japanese Appl. No. JP 2016-545779, dated Sep. 3, 2019, JPO.
Reconsideration Report, Japanese Appl. No. JP 2016-545779, dated Feb. 18, 2020, JPO.
Notification of Reason(s) for Refusal, Japanese Appl. No. JP 2016-545779, dated Aug. 25, 2020, JPO.
First Office Action, Japanese Appl. No. JP 2019-237190, dated Jun. 9, 2020, JPO.
Decision of Refusal, Japanese Appl. No. JP 2019-237190, dated Dec. 15, 2020 JPO.

* cited by examiner

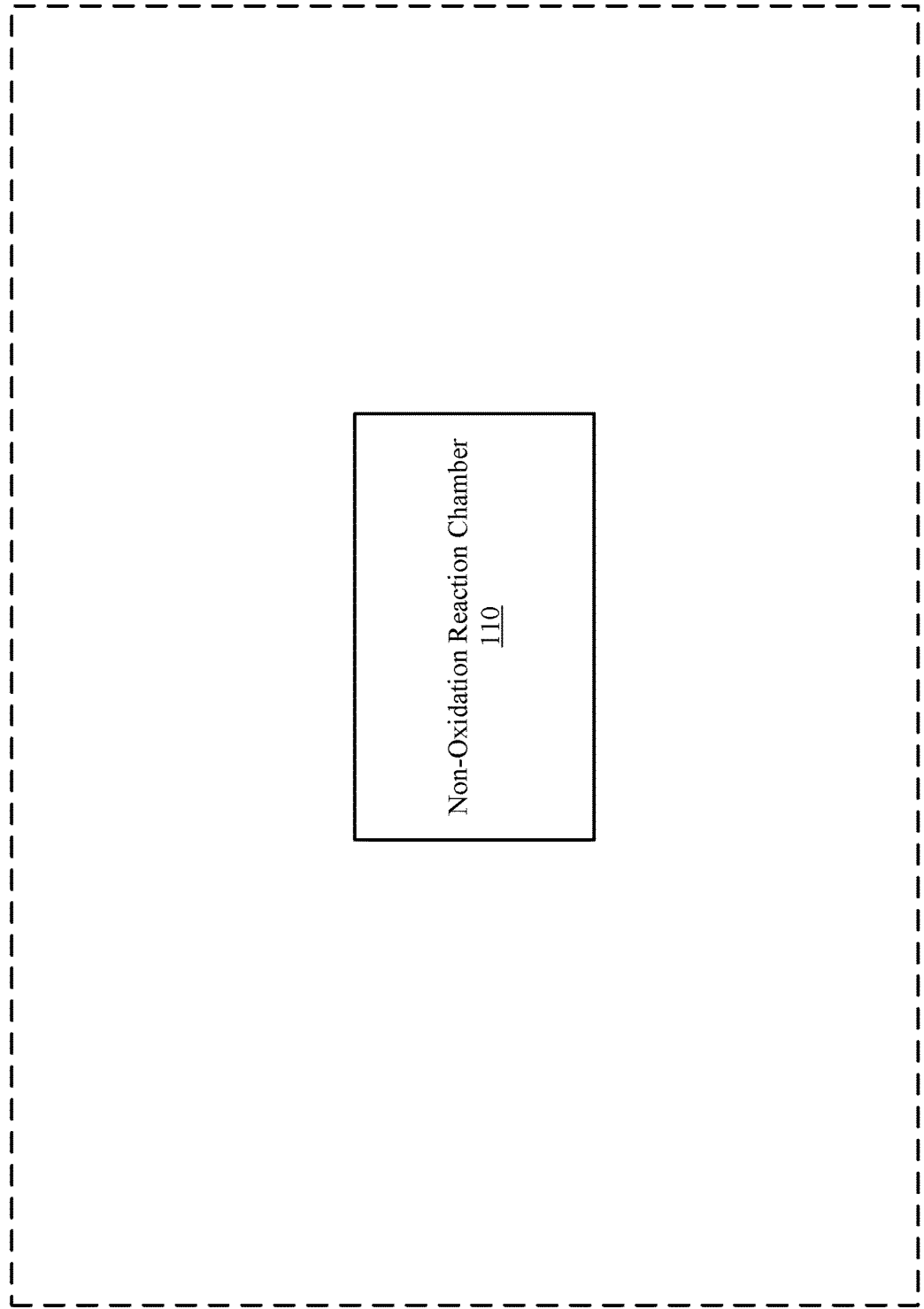

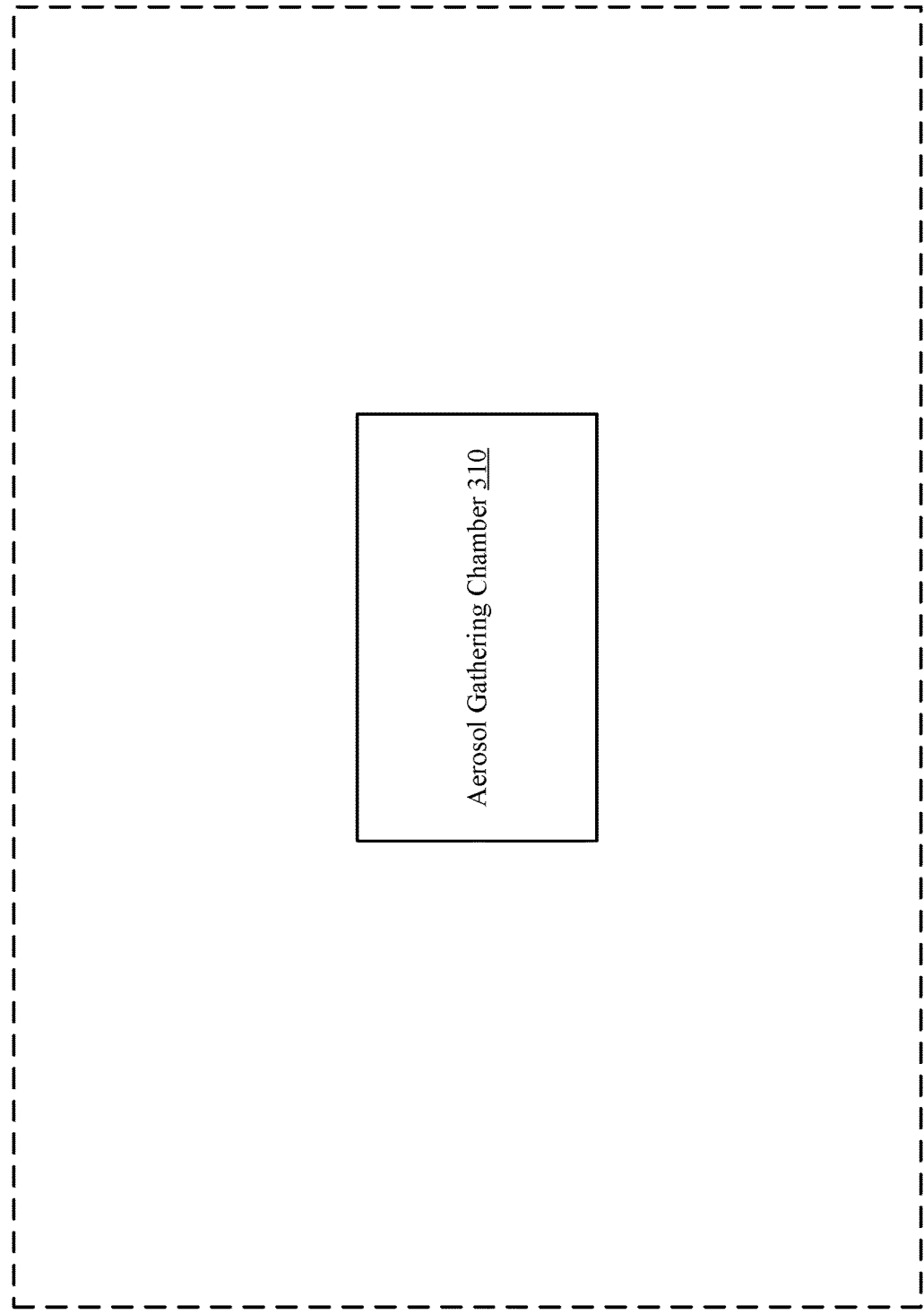

300-b

Bulk Liquid Phase Material Chamber 310-a

Aerosol Production Chamber 305

FIG. 3B

FIG. 3C 300-c

Hydrocarbon Aerosol Production Chamber 305-a — Bulk Liquid Hydrocarbon Chamber 310-b — Disti

```
┌─────────────────────────────────────────┐
│   Heat a carbon-oxygen-hydrogen (C-O-H)  │
│ compound to a temperature of at least 800│
│degrees Celsius such the C-O-H compound   │
│reacts through a non-oxidation reaction to│── 510-a
│generate or produce at least hydrocarbon  │
│compound that is at least a component of  │
│  a liquid hydrocarbon fuel or a          │
│          hydrocarbon chemical            │
└─────────────────────────────────────────┘
```

FIG. 5A 500-c

```
┌─────────────────────────────────────────┐
│ Mix water with biomass to generate a wet biomass │
└─────────────────────────────────────────┘
                    │  505
                    ▼
┌─────────────────────────────────────────┐
│ Transfer the wet biomass to a non-oxidation │
│              reaction chamber              │
└─────────────────────────────────────────┘
                    │  515
                    ▼
┌─────────────────────────────────────────┐
│ Heat the wet biomass such that the mixed water as │
│ well as any water in the original biomass react with │
│  the biomass to generate a hydrocarbon fuel in at  │
│       least a liquid aerosol or vapor state        │
└─────────────────────────────────────────┘
                    │  510-b
                    ▼
┌─────────────────────────────────────────┐
│ Distill directly the hydrocarbon fuel from the │
│        liquid aerosol or vapor state            │
└─────────────────────────────────────────┘
                       524
```

FIG. 5C 600-a

Pass an aerosol through a material in a bulk liquid phase to gather at least a portion of one or more components of the aerosol — 610

FIG. 6A 600-b

```
┌─────────────────────────────────┐
│   Produce a hydrocarbon aerosol │  — 605
└─────────────────────────────────┘
                │
                ▼
┌─────────────────────────────────────────┐
│ Pass the hydrocarbon aerosol through a  │
│ bulk liquid hydrocarbon to gather at    │
│ least a portion of one or more          │  — 610-a
│ components of the hydrocarbon aerosol   │
└─────────────────────────────────────────┘
                │
                ▼
┌─────────────────────────────────┐
│ Distill the gathered hydrocarbon│
│ aerosol component(s)            │  — 615
└─────────────────────────────────┘
                │
                ▼
┌ ─ ─ ─ ─ ─ ─ ─ ─ ─ ─ ─ ─ ─ ─ ─ ─ ┐
│ Augment the bulk liquid hydrocarbon │
│ with at least a portion of the      │  — 620
│ distilled gathered hydrocarbon      │
│ aerosol component(s)                │
└ ─ ─ ─ ─ ─ ─ ─ ─ ─ ─ ─ ─ ─ ─ ─ ─ ┘
```

FIG. 6B

METHODS, SYSTEMS, AND DEVICES FOR LIQUID HYDROCARBON FUEL PRODUCTION, HYDROCARBON CHEMICAL PRODUCTION, AND AEROSOL CAPTURE

CROSS-REFERENCES TO RELATED APPLICATIONS

This application is a continuation of U.S. patent application Ser. No. 14/593,429, filed on Jan. 9, 2015 and entitled "METHODS, SYSTEMS, AND DEVICES FOR LIQUID HYDROCARBON FUEL PRODUCTION, HYDROCARBON CHEMICAL PRODUCTION, AND AEROSOL CAPTURE," now U.S. Pat. No. 10,563,128, issued Feb. 18, 2020, which is a non-provisional patent application claiming priority benefit of U.S. provisional patent application Ser. No. 61/925,801, filed on Jan. 10, 2014 and entitled "METHODS, SYSTEMS, AND DEVICES FOR DIRECT LIQUID HYDROCARBON FUEL PRODUCTION," the entire disclosure of which is herein incorporated by reference for all purposes, U.S. provisional patent application Ser. No. 61/970,444, filed on Mar. 26, 2014 and entitled "METHODS, SYSTEMS, AND DEVICES FOR DIRECT PRODUCTION OF LIQUID HYDROCARBON FUEL," the entire disclosure of which is herein incorporated by reference for all purposes, and U.S. provisional patent application Ser. No. 61/988,954, filed on May 6, 2014 and entitled "METHODS, SYSTEMS, AND DEVICES FOR AEROSOL CAPTURE," the entire disclosure of which is herein incorporated by reference for all purposes.

BACKGROUND

Different methods have been developed to produce fast pyrolysis oil. In some cases, the oil may be converted to liquid fuels by upgrading with hydrogen. Biomass may also be utilized in some cases to produce the fast pyrolysis oil.

While various techniques may exist to generate liquid fuel from biomass or other carbon-oxygen-hydrogen (C—O—H) compounds or chemicals, there may still be a general need for the development of alternative techniques that may provide more direct methods for generating liquid hydrocarbon fuels or hydrocarbon chemicals from C—O—H compounds.

Furthermore, different methods have been developed to capture aerosols. These methods may include different inertial, gravitational, electrostatic, and/or diffusion techniques, for example. While various techniques may exist to capture aerosols, there may still be a general need for the development of alternative and/or improved techniques that may be utilized to capture aerosols, including hydrocarbon aerosols.

BRIEF SUMMARY

Methods, systems, and devices for liquid hydrocarbon fuel production, hydrocarbon chemical production, and/or aerosol capture are provided. For example, methods, systems, and devices are provided that may utilize a high temperature pyrolysis process to produce a range of hydrocarbons from C—O—H compounds, such as biomass or solid waste. The range of hydrocarbons produced in different embodiments may include compounds that include some liquid fuels. These liquid fuels may include, but are not limited to, gasoline, diesel, and/or aviation fuel. Embodiments may produce liquid hydrocarbons that may have energy contents higher than the typical bio-oil from most fast pyrolysis processes.

In some examples, methods, systems, and devices for direct liquid hydrocarbon fuel production and/or hydrocarbon chemical production are provided. For example, a carbon-oxygen-hydrogen (C—O—H) compound (or material containing the C—O—H compound) may be heated to a temperature of at least 800 degrees Celsius such that the C—O—H compound may react through a non-oxidation reaction to generate or produce at least a hydrocarbon compound that may be at least a component of a liquid hydrocarbon fuel or a hydrocarbon chemical. In some cases, the liquid hydrocarbon fuel may be a liquid when at a temperature of 20 degrees Celsius. The non-oxidation reaction may include a pyrolysis reaction, which may be a hydrous pyrolysis reaction in some cases. Some embodiments may include directly distilling the liquid hydrocarbon fuel. The C—O—H compound may include biomass.

In some cases, the hydrocarbon compound produced through the non-oxidation reaction includes a hydrocarbon aerosol form as the hydrocarbon compound (or an aerosol form of the hydrocarbon compound) at least as it is produced or cools. Some embodiments may include passing the hydrocarbon aerosol form through a material in a liquid phase in order to gather the aerosol material. The material in the liquid phase may include a hydrocarbon fuel. Passing the hydrocarbon aerosol through the material in the liquid phase may also include passing the hydrocarbon aerosol form through a mesh, which may be disposed within the material in the liquid phase.

Some embodiments may utilize a non-oxidation reaction chamber that may include a tube furnace. The tube furnace may include a material composition that may include at least a high-nickel metal alloy. Some embodiments may utilize an auger to effect continuous motion of the material containing the C—O—H compound into and through the tube furnace. The material containing the C—O—H compound may be in a solid phase in some cases. The auger may include a material composition that may include at least a high-nickel metal alloy. In some embodiments, the auger may include multiple different pitches between multiple blades, though some embodiments may utilize a single uniform blade pitch.

Some embodiments may utilize a liquid solvent chamber to collect the produced liquid hydrocarbon fuel and/or hydrocarbon chemical. Some embodiments may collect the produced liquid hydrocarbon or hydrocarbon chemical when the hydrocarbons have condensed from a gaseous state. Some embodiments may direct pyrolysis gas that may be produced in the non-oxidation reaction chamber through the liquid solvent chamber. Some embodiments may disperse the gas passing through the liquid solvent chamber to reduce the size of the gas bubbles passing through the chamber. Some embodiments may force the dispersed gas through a tortuous path through the liquid solvent chamber to control the length of time the gas is in contact with the solvent. Some embodiments may use the remainder of the gas after removal of the produced hydrocarbon liquids as a gaseous fuel to produce, for example, heat or electricity. Some embodiments may use the remainder of the gas after removal of the produced hydrocarbon liquids as a gaseous fuel to produce heat. Some embodiments may capture the remainder of the gas after removal of the produced hydrocarbon liquids.

Some embodiments include a method of direct liquid hydrocarbon fuel and/or hydrocarbon chemical production that may include heating a carbon-oxygen-hydrogen (C—O—H) compound to a temperature of at least 800 degrees Celsius such that the C—O—H compound reacts through a non-oxidation reaction to generate and/or to produce at least a hydrocarbon compound that is at least a component of a liquid hydrocarbon fuel or a hydrocarbon chemical. In some embodiments, the liquid hydrocarbon fuel is liquid when at a temperature of 20 degrees Celsius. In some embodiments of the method, the non-oxidation reaction comprises a pyrolysis reaction. The non-oxidation reaction may include a hydrous pyrolysis reaction.

In some embodiments of the method, the non-oxidation reaction may be performed within a tube furnace. The tube furnace may include a material composition that may include at least a high-nickel metal alloy. Some embodiments may include using an auger to effect continuous motion of material containing the C—O—H compound into and through the tube furnace and wherein the material containing the C—O—H compound is in a solid phase. In some embodiments, the auger may include a composition that includes at least a high-nickel metal alloy. The auger may include multiple different pitches between multiple blades in some cases. The auger may include a single pitch between multiple blades in some cases.

In some embodiments, the method may further include directly distilling the produced or generated liquid hydrocarbon fuel or hydrocarbon compound. In some embodiments of the method, the hydrocarbon compound produced through the non-oxidation reaction includes a hydrocarbon aerosol form as the hydrocarbon compound at least is produced or cools. Some embodiments further include passing the hydrocarbon aerosol form through a material in a liquid phase in order to gather the aerosol material. The material in the liquid phase may include a hydrocarbon fuel. Passing the hydrocarbon aerosol through the material in the liquid phase may include passing the hydrocarbon aerosol form through a mesh.

In some embodiments of the method, the non-oxidation reaction further generates a hydrocarbon aerosol. Some embodiments include passing the hydrocarbon aerosol through a liquid fuel. Passing the hydrocarbon aerosol through the liquid fuel may include passing the hydrocarbon aerosol through a mesh.

In some embodiments, the method may further include mixing the liquid hydrocarbon fuel or produced hydrocarbon compound with at least another liquid fuel. In some embodiments of the method, the C—O—H compound includes at least biomass.

In some embodiments of the method, the C—O—H compound has a residence time of at least one second within a non-oxidation reaction chamber. The residence time may be at least 10 seconds, 100 seconds, at least 300 seconds, at least 1000 seconds. In some embodiments, the temperature is at least 900 degrees Celsius or 1100 degrees Celsius. In some embodiments, at least the liquid fuel or the liquid hydrocarbon fuel includes at least gasoline, diesel, or aviation fuel. The liquid hydrocarbon fuel may have an energy content of at least 16,000 BTU/lb or 37,000 kJ/kg.

In some embodiments of the method, the C—O—H compound includes a C—O—H compound mixed with at least water. Heating the C—O—H compound may include reacting the mixed water as well as any water in the original C—O—H compound with the C—O—H compound to generate or to produce at least the liquid hydrocarbon fuel or the hydrocarbon chemical, which may be in at least a liquid aerosol state or vapor states. Some embodiments include transferring the wet C—O—H compound to a reaction chamber before heating the wet C—O—H compound.

Some embodiments include a system for liquid hydrocarbon fuel production or hydrocarbon chemical production that may include a non-oxidation reaction chamber configured to heat a carbon-oxygen-hydrogen (C—O—H) compound to a temperature of at least 800 degrees Celsius such that the C—O—H compound reacts through a non-oxidation reaction to generate at least a hydrocarbon compound that is at least a component of a liquid hydrocarbon fuel or a hydrocarbon chemical. The liquid hydrocarbon fuel may be liquid when at a temperature of 20 degrees Celsius.

In some embodiments of the system, the non-oxidation reaction includes a pyrolysis reaction. The non-oxidation reaction may include a hydrous pyrolysis reaction. In some embodiments, the system includes a distiller configured to directly distill the liquid hydrocarbon fuel or produced hydrocarbon compound.

In some embodiments of the system, the non-oxidation reaction chamber may include a tube furnace. The tube furnace may include a material composition that may include at least a high-nickel metal alloy. For example, a high-nickel steel alloy may be utilized in some cases. Some embodiments of the system may include an auger configured to effect continuous motion of material containing the C—O—H compound into and through the tube furnace. The auger may include a material composition that includes at least a high-nickel metal alloy. The auger may include multiple different pitches between multiple blades in some cases. The auger may include a single pitch between multiple blades in some cases.

In some embodiments of the system, the hydrocarbon compound produced through the non-oxidation reaction includes a hydrocarbon aerosol form as the hydrocarbon compound or an aerosol form of the hydrocarbon compound at least as it is produced or cools. Some embodiments may further include a liquid fuel or solvent chamber coupled with the non-oxidation reaction chamber such that the hydrocarbon aerosol form or the aerosol form of the hydrocarbon compound passes through a material in a liquid phase disposed within the liquid fuel or solvent chamber in order to gather the aerosol material. The material in the liquid phase may include a hydrocarbon fuel. Some embodiments may further include a mesh disposed within the liquid fuel or solvent chamber such that passing the hydrocarbon aerosol through the material in the liquid phase disposed within the liquid fuel or solvent chamber includes passing the hydrocarbon aerosol form or aerosol form of the hydrocarbon compound through the mesh.

In some embodiments of the system, the non-oxidation reaction further generates a hydrocarbon aerosol. Some embodiments may include a liquid fuel chamber coupled with the non-oxidation reaction chamber such that the hydrocarbon aerosol passes through a liquid fuel disposed within the liquid fuel chamber. Some embodiments may include a mesh disposed within the liquid fuel chamber such that passing the hydrocarbon aerosol through the liquid fuel includes passing the hydrocarbon aerosol through the mesh.

In some embodiments, the system may be configured for mixing the liquid hydrocarbon fuel with at least another liquid fuel. For example, some embodiments of the system may include a mixing chamber configured to mix the produced liquid hydrocarbon fuel with at least another liquid fuel.

In some embodiments of the system, the C—O—H compound includes at least biomass. In some embodiments of the system, the C—O—H compound has a residence time of at least one second, 10 seconds, at least 100 seconds, at least 300 seconds, or at least 1000 seconds. In some embodiments, the temperature is at least 900 degrees Celsius or 1100 degrees Celsius.

In some embodiments of the system, the liquid fuel or the hydrocarbon fuel includes at least gasoline, diesel, or aviation fuel. In some embodiments, the liquid hydrocarbon fuel has an energy content of at least 16,000 BTU/lb or 37,000 kJ/kg.

In some embodiments of the system, the C—O—H compound includes a C—O—H compound mixed with at least water. Heating the C—O—H compound may include reacting the mixed water as well as any water in the original C—O—H compound with the C—O—H compound to generate the hydrocarbon fuel in at least a liquid aerosol state or vapor state In some embodiments of the system, the C—O—H compound includes a wet C—O—H compound, such as a C—O—H compound mixed with at least water. For example, the non-oxidation reaction chamber may be configured to heat the C—O—H compound through reacting water comprising the wet C—O—H compound with the C—O—H compound to generate the liquid hydrocarbon fuel In some embodiments, the system may include a conveyor system configured for transferring the wet C—O—H compound to a reaction chamber before heating the wet C—O—H compound. The non-oxidation reaction chamber may be configured to heat the C—O—H compound is configured to react the mixed water as well as any water in the original C—O—H compound with the C—O—H compound to generate hydrocarbon fuel in one or both liquid aerosol and vapor states. Some embodiments of the system may include a conveyor configured to transfer the wet C—O—H compound to the non-oxidation reaction chamber before heating the wet C—O—H compound.

Methods, systems, and devices are provided for aerosol capture, such as liquid hydrocarbon aerosol capture. Some examples may utilize an aerosol gathering chamber that may be configured to pass an aerosol through a material in a bulk liquid phase disposed within the aerosol gathering chamber to gather at least a portion of one or more components of the aerosol. Different configurations of the aerosol gathering chamber may further facilitate the gathering of some or all of one or more components of the aerosol, such as through increasing a path length through the bulk liquid phase material and/or increasing an area of contact between the aerosol and the bulk liquid phase material. Some examples may also include the production of the aerosol and/or the distillation of the gathered aerosol. The distilled aerosol may be utilized to augment the liquid phase material in some cases.

Some embodiments include a method of aerosol capture that may include passing an aerosol through a material in a bulk liquid phase to gather at least a portion of one or more components of the aerosol. The gathered portion of the one or more aerosol components may include at least a hydrocarbon compound. In some embodiments, the gathered portion of the one or more aerosol components includes at least a component of a liquid hydrocarbon. In some embodiments, the material in the bulk liquid phase may include a liquid hydrocarbon, which may include a hydrocarbon fuel. In some embodiments, the material in the bulk liquid phase may include water.

In some embodiments of the method, the material in the bulk liquid phase may be temperature-controlled. The material in the bulk liquid phase may be disposed within a spiral tubing configuration in some cases. The material in the bulk liquid phase may be disposed within an auger.

Some embodiments of the method may include distilling the one or more gathered aerosol components. Some embodiments may include augmenting the material in the bulk liquid phase with all or part of the one or more distilled gathered aerosol components.

In some embodiments of the method, passing the aerosol through the material in the bulk liquid phase may include passing the aerosol through a mesh of solid material disposed within the material in the bulk liquid phase. In some embodiments, passing the aerosol through the material in the bulk liquid phase further may include passing the aerosol through the material in the bulk liquid phase with respect to multiple baffles disposed within the material in the liquid phase. Passing the aerosol through the material in the bulk liquid phase may include passing the aerosol through the material in the bulk liquid phase through a mesh of solid material disposed around the multiple baffles disposed within the material in the bulk liquid phase.

Some embodiments of the method may include removing water with respect to the remainder of the material in the bulk liquid phase. In some cases, removing the water with respect to the remainder of the material in the bulk liquid phase includes removing water that may be immiscible with the remainder of the material in the bulk liquid phase. In some cases, removing the water with respect to the remainder of the material in the bulk liquid phase includes removing water that may be immiscible with and gravimetrically separable from the remainder of the material in the bulk liquid phase.

Some embodiments of the method include producing the aerosol. The aerosol may include at least a hydrocarbon compound or a component of a liquid hydrocarbon. The aerosol may include at least the hydrocarbon compound or the component of the liquid hydrocarbon that may be produced from biomass. In some embodiments, the hydrocarbon compound or the component of the liquid hydrocarbon includes at least a hydrocarbon fuel or a hydrocarbon chemical.

Some embodiments include a system for aerosol capture that may include an aerosol gathering chamber configured to pass an aerosol through a material in a bulk liquid phase disposed within the aerosol gathering chamber to gather at least a portion of one or more components of the aerosol. In some embodiments, the gathered portion of the one or more aerosol components includes at least a hydrocarbon compound. The gathered portion of the one or more aerosol components may include at least a component of a liquid hydrocarbon. The material in the bulk liquid phase may include a liquid hydrocarbon. The material in the bulk liquid phase may include water. The material in the bulk liquid phase may be temperature-controlled.

Some embodiments of the system include one or more lengths of tubing in a spiral configuration containing the material in the bulk liquid phase to increase a path length through the material in the bulk liquid phase. Some embodiments of the system include one or more augers disposed within the aerosol gathering chamber to increase a path length through the material in the bulk liquid phase. Some embodiments of the system include one or more distilling systems coupled with the aerosol gathering chamber to distill all or part of the gathered portions of the one or more aerosol components. Some embodiments of the system include one or more couplers configured to couple one or more of the one or more distillers to the aerosol gathering chamber to augment the material in the bulk liquid phase with all or part of the distilled gathered portions of the one or more aerosol components.

Some embodiments of the system include a mesh of a solid material disposed within the aerosol gathering chamber configured to increase the area of contact between the aerosol and the material in the bulk liquid phase and through which the aerosol and material in the bulk liquid phase are passed. Some embodiments of the system include multiple baffles disposed within the aerosol gathering chamber configured to increase a path length through the material in the bulk liquid phase. Some embodiments of the system include the mesh of solid material disposed around the multiple baffles within the aerosol gathering chamber configured to increase the area of contact between the aerosol and the material in the bulk liquid phase and through which the aerosol and material in the liquid phase are passed.

Some embodiments of the system include one or more ports coupled with the aerosol gathering chamber to allow removal of at least a portion of at least the portion of the one or more gather aerosol components or water from the aerosol gathering chamber. Some embodiments of the system include one or more ports coupled with the aerosol gathering chamber to allow removal of a portion of at least the portion of the one or more gathered aerosol components from the aerosol gathering chamber.

Some embodiments of the system include one or more aerosol production chambers coupled with the aerosol gathering chamber. The one or more aerosol production chambers may include an aerosol production chamber producing at least a hydrocarbon compound or a component of a liquid hydrocarbon in some cases. The aerosol may include at least the hydrocarbon compound or the component of the liquid hydrocarbon that may be produced from biomass in some cases.

Some embodiments include methods, systems, and/or devices as described in the detailed description and/or shown in the figures.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the different embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 1A shows a liquid hydrocarbon fuel or hydrocarbon chemical production system in accordance with various embodiments.

FIG. 1B shows a liquid hydrocarbon fuel or hydrocarbon chemical production system in accordance with various embodiments.

FIG. 1C shows a liquid hydrocarbon fuel or hydrocarbon chemical production system in accordance with various embodiments.

FIG. 1D shows a liquid hydrocarbon fuel or hydrocarbon chemical production system in accordance with various embodiments.

FIG. 1E shows a liquid hydrocarbon fuel or hydrocarbon chemical production system in accordance with various embodiments.

FIG. 2A is a schematic diagram of a system for conversion of C—O—H compounds into hydrocarbon compounds in accordance with various embodiments.

FIG. 2B is a schematic diagram of a system for conversion of C—O—H compounds into hydrocarbon compounds in accordance with various embodiments.

FIG. 3A shows an aerosol capture system in accordance with various embodiments.

FIG. 3B shows an aerosol capture system in accordance with various embodiments.

FIG. 3C shows an aerosol capture system in accordance with various embodiments.

FIG. 4A shows an aerosol capture system in accordance with various embodiments.

FIG. 4B shows an aerosol capture system in accordance with various embodiments.

FIG. 4C shows an aerosol capture system in accordance with various embodiments.

FIG. 4D shows an aerosol capture system in accordance with various embodiments.

FIG. 4E shows an aerosol capture system in accordance with various embodiments.

FIG. 5A is a flow diagram of a method for liquid hydrocarbon fuel or hydrocarbon chemical production in accordance with various embodiments.

FIG. 5B is a flow diagram of a method for liquid hydrocarbon fuel or hydrocarbon chemical production in accordance with various embodiments.

FIG. 5C is a flow diagram of a method for liquid hydrocarbon fuel or hydrocarbon chemical production in accordance with various embodiments.

FIG. 5D is a flow diagram of a method for liquid hydrocarbon fuel or hydrocarbon chemical production in accordance with various embodiments.

FIG. 5E is a flow diagram of a method for liquid hydrocarbon fuel or hydrocarbon chemical production in accordance with various embodiments.

FIG. 5F is a flow diagram of a method for liquid hydrocarbon fuel or hydrocarbon chemical production in accordance with various embodiments.

FIG. 6A is a flow diagram of a method for aerosol capture in accordance with various embodiments.

FIG. 6B is a flow diagram of a method for aerosol capture in accordance with various embodiments.

DETAILED DESCRIPTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments, it being understood that various changes may be made in the function and arrangement of elements without departing from the spirit and scope of the invention as set forth in the appended claims. Several embodiments are described herein, and while various features are ascribed to different embodiments, it should be appreciated that the features described with respect to one embodiment may be incorporated within other embodiments as well. By the same token, however, no single feature or features of any described embodiment should be considered essential to every embodiment, as other embodiments may omit such features.

Specific details are given in the following description to provide a thorough understanding of the embodiments. However, it will be understood by one of ordinary skill in the art that the embodiments may be practiced without these specific details. For example, systems, networks, processes, and other elements in embodiments may be shown as components in block diagram form in order not to obscure the embodiments in unnecessary detail. In other instances, well-known processes, structures, and techniques may be shown without unnecessary detail in order to avoid obscuring the embodiments.

Also, it is noted that individual embodiments may be described as a process which may be depicted as a flowchart, a flow diagram, a structure diagram, or a block diagram. Although a flowchart may describe the operations as a sequential process, many of the operations can be performed in parallel or concurrently. In addition, the order of the operations may be rearranged. A process may be terminated when its operations are completed, but could also comprise additional operations not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

Furthermore, embodiments may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

Methods, systems, and devices for liquid hydrocarbon fuel production, hydrocarbon chemical production, and/or aerosol capture are provided. For example, methods, systems, and devices are provided that may utilize a high temperature pyrolysis process to produce a range of hydrocarbons from C—O—H compounds, such as biomass or contained in such materials as biomass or solid waste for example. The range of hydrocarbons produced in different embodiments may include compounds that may include some liquid fuels or hydrocarbon chemicals. The liquid fuels may include, but are not limited to, gasoline, diesel, and/or aviation fuel. Embodiments may produce liquid hydrocarbons that may have energy contents higher than the typical bio-oil from most fast pyrolysis process.

Some embodiments may utilize C—O—H compounds, such as cellulose, lignin, and/or hemicellulose, which may be found in biomass. Many biomass feedstocks may have one or more of a mixture of cellulose, lignin, hemicellulose, and/or trace minerals in their component materials. Some embodiments may utilize feedstocks that include other C—O—H compounds, such as paper waste, sawdust of a wide variety of wood types, cardboard, hay, straw, switchgrass, municipal solid waste, sanitized waste, simulated nuclear waste, demolition and construction wood waste; these various feedstocks may generally be referred to waste products. In general, materials that may include a C—O—H compound may be utilized in different embodiments.

A general overview of a system 100-*a* for direct liquid hydrocarbon fuel production or hydrocarbon chemical production in accordance with various embodiments is provided with FIG. 1A. System 100-*a* may include a non-oxidation reaction chamber 110. The specific component(s) shown are intended merely to be illustrative. Some embodiments may include other components, not necessarily shown, that may be utilized. Some, but not all of these variants, may be noted in the description that follows.

In some embodiments, the non-oxidation reaction chamber 110 may be utilized to heat a carbon-oxygen-hydrogen (C—O—H) compound to a temperature of at least 800 degrees Celsius such that the C—O—H compound reacts through a non-oxidation reaction to generate or produce at least a hydrocarbon compound that may be at least a component of a liquid hydrocarbon fuel or a hydrocarbon chemical. In some cases, the liquid hydrocarbon fuel may be a liquid when at a temperature of 20 degrees Celsius. The non-oxidation reaction may include a pyrolysis reaction. The non-oxidation reaction may include a hydrous pyrolysis reaction. Some embodiments of system 100-*a* may be configured to distill the liquid hydrocarbon fuel, which may be done directly in some cases.

In some embodiments of system 100-*a*, the non-oxidation reaction chamber 110 may include a tube furnace. The tube furnace may include a material composition that may include at least a high-nickel metal alloy, such as a high-nickel steel alloy for example. Some embodiments of system 100-*a* may include an auger (not shown) to effect continuous motion of the material containing the C—O—H compound into and through the tube furnace. The material in the C—O—H compound may be in a solid phase in some cases. The auger may include a material composition that may include at least a high-nickel metal alloy, such as a high-nickel steel alloy. In some embodiments, the auger may include multiple different pitches between multiple blades, though some embodiments may utilize a single uniform blade pitch. Different pitches may be useful in increasing and/or decreasing the residence time of the C—O—H compound in one or more portions of the tube furnace.

In some embodiments of system 100-*a*, the hydrocarbon compound generated or produced through the non-oxidation reaction produced utilizing the non-oxidation reaction chamber 110 may include a hydrocarbon aerosol form as the hydrocarbon compound (or an aerosol form of the hydrocarbon compound) at least as it is produced or cools. Some embodiments of system 100-*a* may be configured to pass the hydrocarbon aerosol form through a material in a liquid phase in order to gather the aerosol material. The material in the liquid phase may include a hydrocarbon fuel. Some embodiments of system 100-*a* may include a mesh coupled with the liquid material such that passing the hydrocarbon aerosol through the material in the liquid phase includes passing the hydrocarbon aerosol form through the mesh.

In some embodiments of system 100-*a*, the non-oxidation reaction may generate a hydrocarbon aerosol. Some embodiments of system 100-*a* may be configured such that the hydrocarbon aerosol may be passed through a liquid fuel. Passing the hydrocarbon aerosol through the liquid fuel may include passing the hydrocarbon aerosol through a mesh. This may facilitate reduce the size of bubbles of the hydrocarbon aerosol. In some cases, the hydrocarbon aerosol may include naphthalene.

Some embodiments of system 100-a may be configured such that the liquid hydrocarbon fuel may be mixed with at least another liquid fuel. The liquid hydrocarbon fuel and/or the other liquid fuel may include, but are not limited to, at least gasoline, diesel, or aviation fuel. The C—O—H compound may include at least biomass.

In some embodiments of system 100-a, the non-oxidation reaction chamber 110 may be configured such that the C—O—H compound may have a residence time. For example, in some embodiments, the residence time may be at least: one second, 10 seconds, 100 seconds, 300 seconds, and/or 1000 seconds. In some embodiments of system 100-a, the non-oxidation reaction chamber 110 may be configured such that the temperature may be at least 900 degrees; other embodiments may utilize a temperature at least 1100 degrees Celsius.

In some embodiments of system 100-a, the liquid hydrocarbon fuel may have an energy content of at least 16,000 BTU/lb or 37,000 kJ/kg. In some cases, the liquid hydrocarbon fuel may have an energy content of at least 20,000 BTU/lb or 46,000 kJ/kg. For example, the liquid hydrocarbon fuel may have an energy content comparable with different forms of diesel fuel.

In some embodiments, systems 100-a may be configured such that the C—O—H compound may be mixed with at least water. The non-oxidation reaction chamber 110 may be configured to heat the C—O—H compound such that the mixed water as well as any water in the original C—O—H compound may react with the C—O—H compound to generate the hydrocarbon fuel in at least a liquid aerosol state or vapor state. Some embodiments of system 100-a may be configured for transferring the C—O—H compound mixed with water to the non-oxidation reaction chamber 110 before reacting the mixed water as well as any water in the original C—O—H compound with the C—O—H compound to generate the hydrocarbon fuel in at least a liquid aerosol state or vapor state.

Some embodiments of system 100-a may utilize a C—O—H compound that includes a wet C—O—H compound, though the C—O—H compound may be dry in some cases. Heating the C—O—H compound in the non-oxidation reaction chamber 110 may include reacting water that is part of the wet C—O—H compound with the C—O—H compound to generate the liquid hydrocarbon fuel. Some embodiments of system 100-a may be configured such that the wet C—O—H compound may be transferred into the non-oxidation reaction chamber 110 before heating the wet C—O—H compound. This process may be referred to as a hydrous pyrolysis process, which may utilize water from the wet compound in the reaction and where the reaction does not utilize oxygen as a non-oxidation or pyrolysis reaction.

Another general overview of a system 100-b for direct liquid hydrocarbon fuel production or hydrocarbon chemical production in accordance with various embodiments is provided with FIG. 1B. System 100-b may be an example of system 100-a of FIG. 1A. System 100-b may include a pyrolysis reaction chamber 110-a, which may be an example of the non-oxidation reaction chamber 110 of FIG. 1A. System 100-b may also include a liquid fuel and/or liquid solvent chamber 120 and/or a distiller 130.

The pyrolysis reaction chamber 110-a may be configured to heat a C—O—H compound, such as biomass, to a temperature of at least 800 degrees Celsius such that the C—O—H compound reacts through a pyrolysis reaction to producer or generate at least a hydrocarbon compound that may be at least a component of a liquid hydrocarbon fuel or a hydrocarbon chemical. In some cases, the liquid hydrocarbon fuel may be a liquid when at a temperature of 20 degrees Celsius. Some embodiments may be configured such that the pyrolysis reaction chamber 110-a heats to the C—O—H compound to at least 900 degrees Celsius; some embodiments may heat the C—O—H compound to at least 1100 degrees Celsius.

The hydrocarbon compound produced by the pyrolysis reaction chamber 110-a may include a hydrocarbon aerosol form as the hydrocarbon compound at least is produced or cools. System 100-b may be configured such that the hydrocarbon aerosol may pass through a material in a liquid phase within the liquid fuel/solvent chamber 120 in order to gather the aerosol material. The material in the liquid phase may include a hydrocarbon fuel. In some cases, a mesh may be placed within the liquid fuel chamber 120 such that passing the hydrocarbon aerosol through the material in the liquid phase includes passing the hydrocarbon aerosol form through the mesh.

For example, system 100-b may include the liquid fuel/ solvent chamber 120 configured such that the hydrocarbon aerosol form of the produced hydrocarbon compound may pass through a material in a liquid phase disposed within the fuel/liquid solvent chamber 120 in order to gather the aerosol material. The material in the liquid phase may include a hydrocarbon fuel. In some cases, a mesh may be placed within the liquid fuel/solvent chamber 120 such that passing the hydrocarbon aerosol through the material in the liquid phases also includes passing the hydrocarbon aerosol form through the mesh.

In some embodiments of system 100-b, the liquid hydrocarbon fuel may be directly distilled by distiller 130. This may involve not utilizing one or more catalysts in some cases. For example, the distiller 130 may be utilized to distill the liquid hydrocarbon fuel that may be collected in the liquid fuel/solvent chamber 120.

Figure 1C:
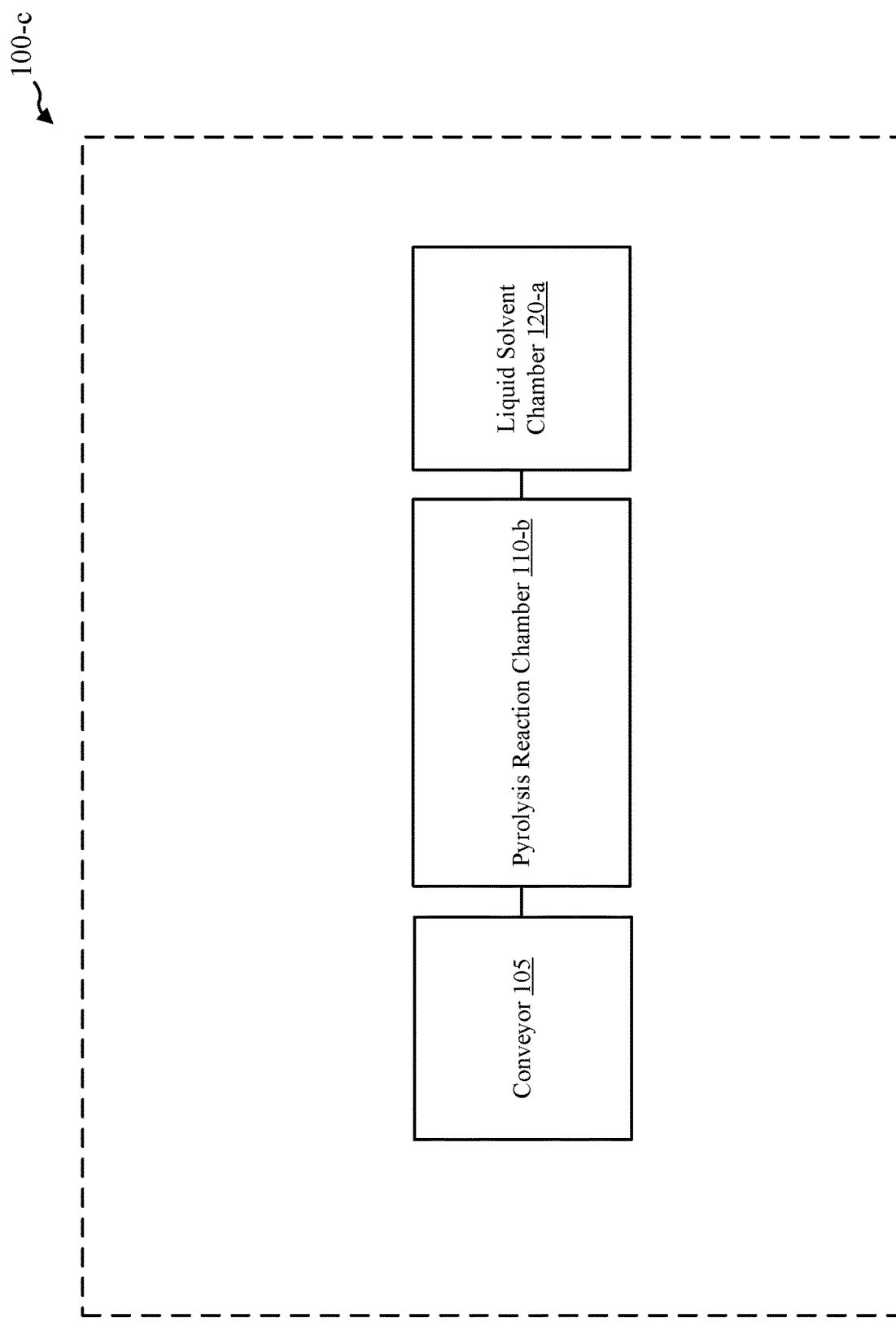

Another general overview of a system 100-c for direct liquid hydrocarbon fuel production or hydrocarbon chemical production in accordance with various embodiments is provided with FIG. 1C. System 100-c may be an example of aspects of system 100-a of FIG. 1A and/or system 100-b of FIG. 1B. System 100-c may include a pyrolysis reaction chamber 110-b, which may be an example of the non-oxidation reaction chamber 110 of FIG. 1A or the pyrolysis reaction chamber 110-a of FIG. 1B, for example. System 100-c may also include a conveyor 105. System 100-c may also include a liquid solvent chamber 120-a in some cases; the liquid solvent chamber may be an example of the liquid fuel and/or liquid solvent chamber 120 of FIG. 1B.

The pyrolysis reaction chamber 110-b may be configured to heat a C—O—H compound to a temperature of at least 800 degrees Celsius such that the C—O—H compound reacts through a pyrolysis reaction to produce at least a hydrocarbon compound that may be at least a component of a liquid hydrocarbon fuel or a hydrocarbon chemical. In some cases, the liquid hydrocarbon fuel may be a liquid when at a temperature of 20 degrees Celsius.

Some embodiments of system 100-c may include the conveyor 105, to effect continuous motion of the material containing the C—O—H compound into and through the pyrolysis reaction chamber 110-b. The conveyor 105 may be configured as an auger. The auger may include a material composition that may include at least a high-nickel metal alloy. For example, a high-nickel steel alloy may be utilized, though other alloys may also be utilized. In some embodiments, the auger may include multiple different pitches between multiple blades, though some embodiments may utilize a single uniform blade pitch. In some embodiments of system 100-c, the pyrolysis reaction chamber 110-b may include a tube furnace. The tube furnace may include a material composition that may include at least a high-nickel metal alloy. A high-nickel steel alloy may be utilized in some cases, though other alloys may also be utilized.

The hydrocarbon compound produced by the pyrolysis reaction chamber 110-b may include a hydrocarbon aerosol form of the hydrocarbon compound at least as it is produced or as it cools. System 100-c may include the liquid solvent chamber 120-a configured such that the hydrocarbon aerosol form of the produced hydrocarbon compound may pass through a material in a liquid phase disposed within the liquid solvent chamber 120-a in order to gather the aerosol material. The material in the liquid phase may include a hydrocarbon fuel. In some cases, a mesh may be placed within the liquid solvent chamber 120-a such that passing the hydrocarbon aerosol through the material in the liquid phase also includes passing the hydrocarbon aerosol form through the mesh.

Figure 1D:
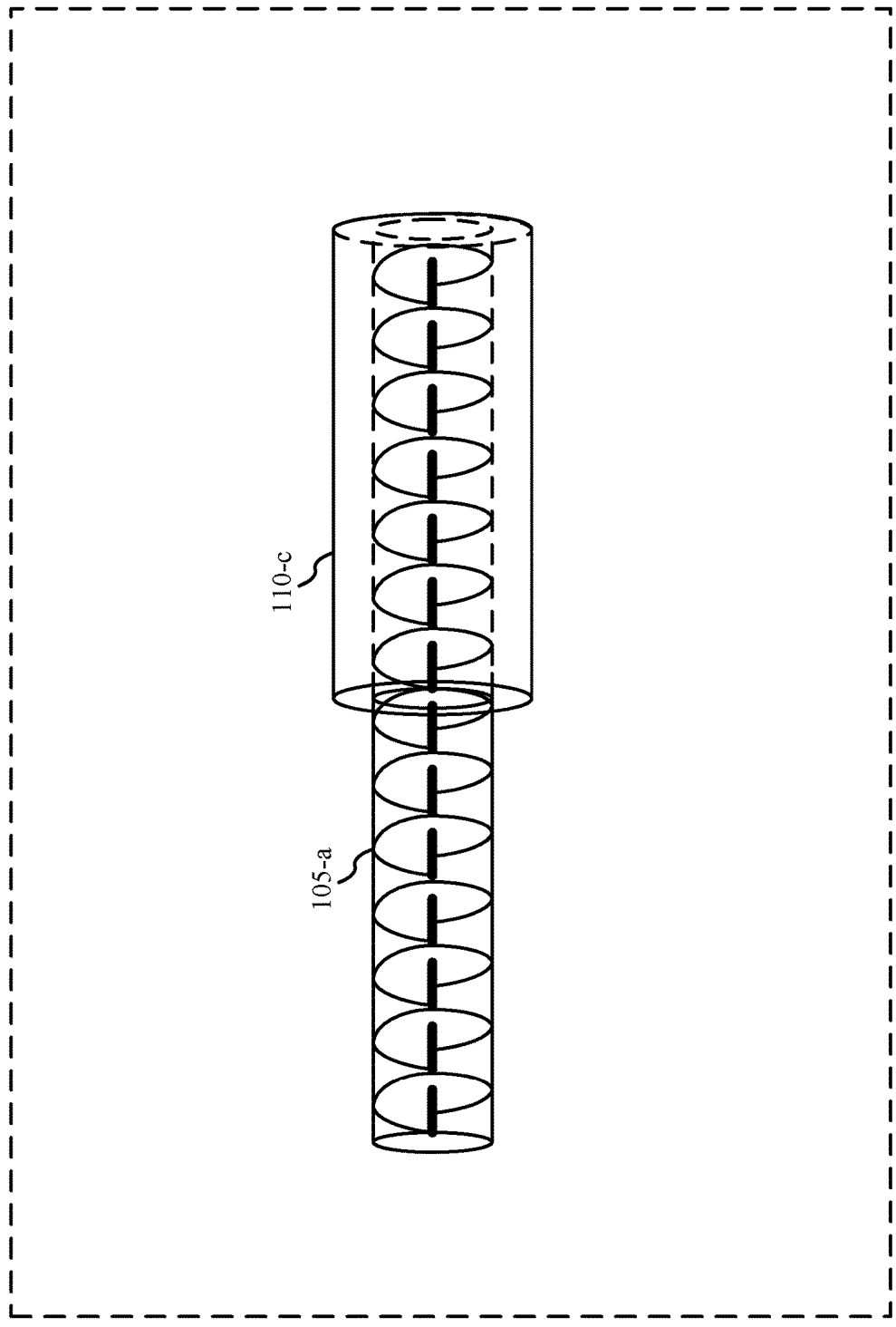

FIG. 1D shows a system 100-d for direct liquid hydrocarbon fuel production or hydrocarbon chemical production in accordance with various embodiments. System 100-d may be an example of aspects of system 100-a of FIG. 1A, system 100-b of FIG. 1B, and/or system 100-c of FIG. 1C. System 100-d may include a tube furnace 110-c, which may be an example of the non-oxidation reaction chamber 110-a of FIG. 1A, the pyrolysis reaction chamber 110-b of FIG. 1B, and/or the pyrolysis reaction chamber 110-c of FIG. 1C. System 100-d may also include an auger 105-a, which may be an example of the conveyor 105 of FIG. 1C.

The tube furnace 110-c may be configured to heat a C—O—H compound to a temperature of at least 800 degrees Celsius such that the C—O—H compound reacts through a pyrolysis reaction to produce at least a hydrocarbon compound that may be at least a component of a liquid hydrocarbon fuel or a hydrocarbon chemical. In some cases, the liquid hydrocarbon fuel may be a liquid when at a temperature of 20 degrees Celsius. Some embodiments may be configured such that the tube furnace 110-c heats to the C—O—H compound to at least 900 degrees Celsius; some embodiments may heat the C—O—H compound to at least 1100 degrees Celsius.

The auger 105-a may affect continuous motion of the material containing the C—O—H compound into and through the tube furnace 110-c. The auger 105-a may include a material composition that may include at least a high-nickel metal alloy, such as a high-nickel steel alloy. In some embodiments, the auger 105-a may include multiple different pitches between multiple blades, though some embodiments may utilize a single uniform blade pitch. In some embodiments of system 100-d, the tube furnace 110-c may include a material composition that may include at least a high-nickel metal alloy, such as a high-nickel steel alloy.

Figure 1E:
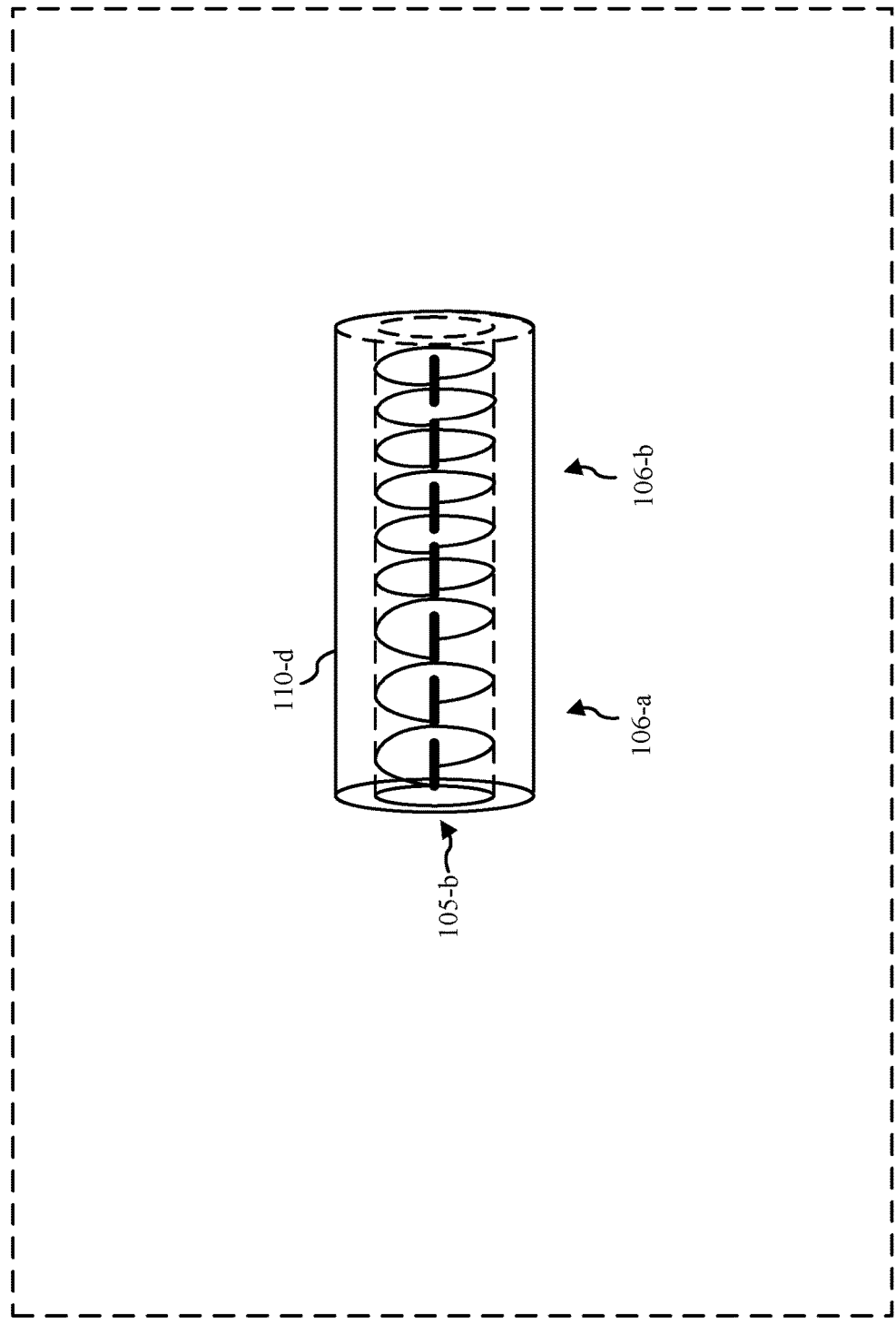

FIG. 1E shows another system 100-e for direct liquid hydrocarbon fuel production or hydrocarbon chemical production in accordance with various embodiments. System 100-e may be an example of aspects of system 100-a of FIG. 1A, system 100-b of FIG. 1B, system 100-c of FIG. 1C, and/or system 100-d of FIG. 1D. System 100-e may include a tube furnace 110-d, which may be an example of the non-oxidation reaction chamber 110 of FIG. 1A, the pyrolysis reaction chamber 110-a of FIG. 1B, the pyrolysis reaction chamber 110-b of FIG. 1C, and/or the tube furnace 100-c of FIG. 1D. System 100-e may also include an auger 105-b, which may be an example of the conveyor 105 of FIG. 1C.

The tube furnace 110-d may be configured to heat a C—O—H compound to a temperature of at least 800 degrees Celsius such that the C—O—H compound reacts through a pyrolysis reaction to produce at least a hydrocarbon compound that may be at least a component of a liquid hydrocarbon fuel or a hydrocarbon chemical. In some cases, the liquid hydrocarbon fuel may be a liquid when at a temperature of 20 degrees Celsius. Some embodiments may be configured such that the tube furnace 110-d heats to the C—O—H compound to at least 900 degrees Celsius; some embodiments may heat the C—O—H compound to at least 1100 degrees Celsius.

The auger 105-b may affect continuous motion of the material containing the C—O—H compound into and through the tube furnace 110-d. The auger 105-b may include a material composition that may include at least a high-nickel metal alloy, such as a high-nickel steel alloy. In some embodiments, the auger 105-b may include multiple different pitches between multiple blades. For example, auger 105-b may have a first section 106-a, which may have blades with a first pitch, and a second section 106-b with a second pitch. In this example, the second pitch may be less than the first pitch. This may result in the C—O—H compound having a longer residence time per unit length in the second section 106-b, for example. Other variations may be utilized, such as more sections with different pitches. Increasing the pitching of a section may in general decrease the residence time per unit length. In some embodiments, increasing the residence time may be utilized to increase the amount of bio-char produced. In some cases, decreasing the residence time may be utilized to affect the amount of pyrolysis occurring. In some embodiments of system 100-d, the tube furnace 110-d may include a material composition that may include at least a high-nickel metal alloy, such as a high-nickel steel alloy.

Figure 2A:
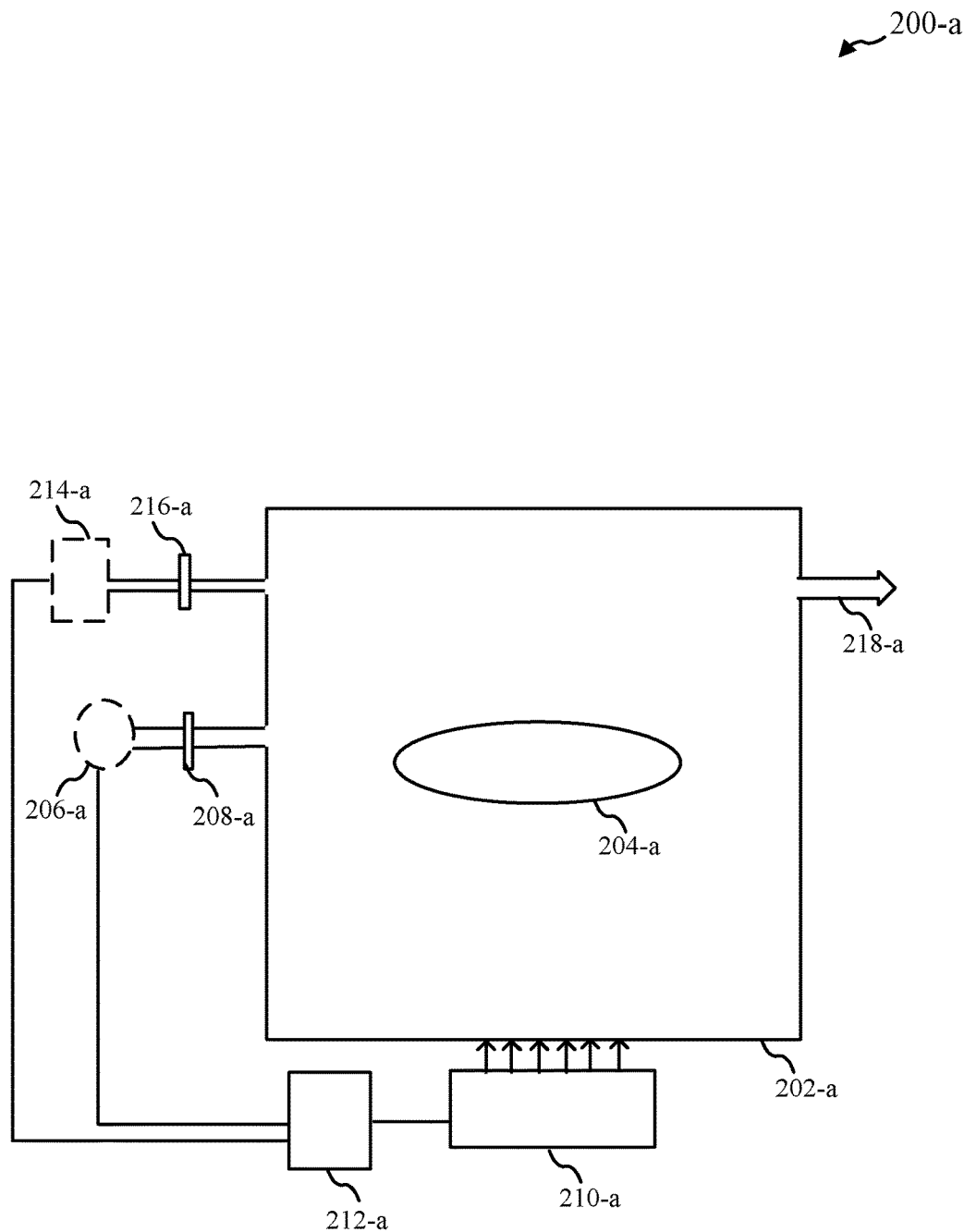

Turning now to FIG. 2A, a system 200-a for direct liquid hydrocarbon fuel production or hydrocarbon chemical production in accordance with various embodiments is provided. In some embodiments, system 200-a may be an example of aspects of system 100-a of FIG. 1A, system 100-b of FIG. 1B, system 100-c of FIG. 1C, system 100-d of FIG. 1D, and/or system 100-e of FIG. 1E.

The system 200-a may include a chamber 202-a, a heating system 210-a in a thermal communication with the chamber 202-a, an optional gas supply line 214-a for providing inert and/or non-inert gas into the chamber 202-a, an optional water supply line 206-a for water to be added to the chamber 202-a by using optional valve 208-a, an exhaust line 218-a to allow the products (such as hydrocarbon chemicals, hydrocarbon compounds, and/or liquid hydrocarbon fuels, for example) to exit the chamber 202-a to flow into other components (not shown). Components such as chamber 202-a may be examples of aspects of non-oxidation reaction chamber 110 of FIG. 1A, pyrolysis reaction chamber 110-a of FIG. 1B, the pyrolysis reaction chamber 110-b of FIG. 1C, the tube furnace 110-c of FIG. 1D, and/or the tube furnace 110-d of FIG. 1E.

The C—O—H compound 204-a may be disposed within the chamber 202-a. Examples of C—O—H compounds 204-a, which may be found suitable for methods in accordance with various embodiments may include, but are not limited to, sources of biomass such as cellulose, hemicellulose, and/or sources of lignin, such as found in biomass. Some processes may use an inert and/or non-inert gas, which may be admitted to the chamber 202-a through one or more valves 216-a; the controller 212-a may control when to continuously purge chamber 202-a with inert and/or non-inert gas by using a valve 216-a. The controller 212-a may also control the heating system 210-a to provide the elevated temperatures that the chamber needs to cause the C—O—H compound 204-a to be dissociated and/or reacted in the environment within the chamber 202-a. In some embodiments, the heating system 202-a may be configured to heat the chamber 202-a to at least 800 degrees Celsius; some embodiments may be configured to heat the chamber 202-a to at least 900 degrees, or even at least 1100 degrees in some cases. The controller 212-a may also control the rate of speed of the insertion of the material containing the C—O—H compound into the chamber 202-a. In some embodiments, the controller 212-a may further control the temperature of the heating system 210-a to heat the C—O—H compound 204-a to cause the chemical reaction of the C—O—H compound 204-a.

During the C—O—H compound processing, the system 200-a may run between atmospheric pressure and a slightly greater pressure, which may be up to about 20 torr gage or more in some cases. This may serve to minimize leaks of air in the system and may significantly reduce the risk of an escalating pressure event, such as an explosion.

In some embodiments, the optional water supply line 206-a may be configured such that water may be combined with the C—O—H compound to create a wet form of the compound before it is introduced into chamber 202-a. Some embodiments may include a conveyor mechanism (not shown) that may be utilized to transfer the wet compound into the chamber 202-a. Some conveyor mechanisms may be utilized to convey the C—O—H compound through chamber 202-a.

Figure 2B:
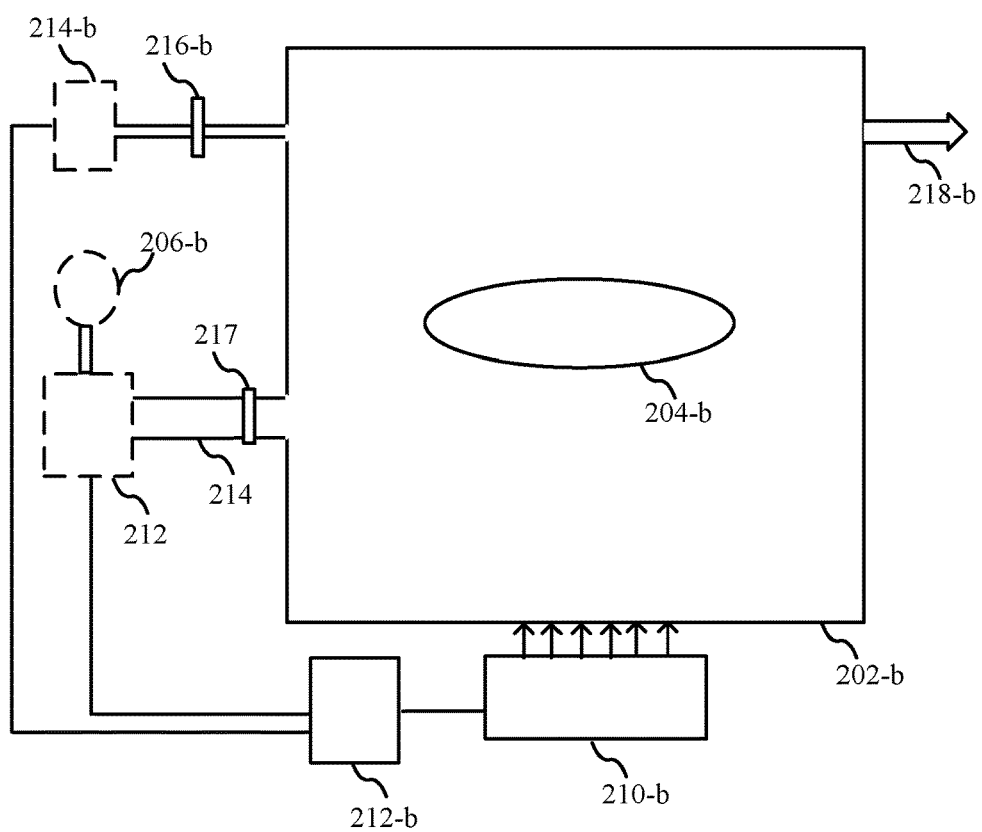

A general overview of another simplified system 200-b for direct liquid hydrocarbon fuel production or hydrocarbon chemical production in accordance with various embodiments is provided with FIG. 2B. In some embodiments, system 200-b may be an example of the aspects of system 100-a of FIG. 1A, system 100-b of FIG. 1B, system 100-c of FIG. 1C, system 100-d of FIG. 1D, and/or system 100-e of FIG. 1E.

The system 200-b may include a chamber 202-b, a heating system 210-b in a thermal communication with the chamber 202-b, an optional gas supply line 214-b for providing inert and/or non-inert gas into the chamber 202-b, an optional water supply line 206-b for water to be added to a C—O—H compound within an optional feed stock hopper or chamber 222, an exhaust line 218-b to allow the reaction products (such as hydrocarbon chemicals, hydrocarbon components and/or liquid hydrocarbon fuel) to exit the chamber 202-b, and/or a controller 212-b. The C—O—H compound 204-b may disposed within the chamber 202-b. Examples of C—O—H compounds 204-b, which may be wet or dry, that may be found suitable for methods in accordance with various embodiments include, but are not limited to, sources of biomass such as cellulose, hemicellulose, and/or sources of lignin, such as found in biomass. Components such as chamber 202-b may be examples of aspects of non-oxidation reaction chamber 110 of FIG. 1A, pyrolysis reaction chamber 110-a of FIG. 1B, pyrolysis reaction chamber 110-b of FIG. 1C, tube furnace 110-c of FIG. 1D, and/or tube furnace 110-d of FIG. 1E.

Some embodiments may utilize processes that may use an inert and/or non-inert gases, admitted to the chamber 202-b through one or more valves 216-b, which may be controlled by controller 212-b. The controller 212-b may control when to continuously purge chamber 202-b with inert and/or non-inert gases by using a valve 216-b, for example. The controller 212-b may control the heating system 210-b to provide the elevated temperatures within the chamber 202-b to cause the C—O—H compound 204-b to be dissociated in the environment within the chamber 202-b. In some embodiments, the heating system 202-b may be configured to heat the chamber 202-b to at least 800 degrees Celsius, at least 900 degrees Celsius, and/or at least 1100 degrees Celsius. The controller 212-b may also control the rate of speed of the insertion of material containing the C—O—H compound into the chamber 202-b. A valve 217 may be utilized in some cases. The controller 212-b may further control the temperature of the heating system 210-b to heat the C—O—H compound 204-b to cause the chemical reaction of the C—O—H compound 204-b.

During the biomass processing, the system 200-b may run at between atmospheric pressure and a slightly greater pressure, which may be about 20 torr gage or more in some cases. This may serve to minimize leaks in the system and may significantly reduce the risk of an escalating pressure event such as an explosion, for example.

In some embodiments, the optional water supply line 206-b may be configured such that water may be combined with the C—O—H compound to create a wet form of the compound before it is introduced into chamber 202-b, such as in feedstock hopper or chamber 222. Some embodiments may include a conveyor mechanism 214 that may be utilized to transfer the wet or dry compound into the chamber 202-b. The conveyor mechanism 214 may include an auger in some cases. Some embodiments may utilize gravity to help transfer the material containing the C—O—H compound into chamber 202-b. In some cases, the material containing the C—O—H compound may be manually transferred into the chamber 202-b.

Some methods, systems, and devices are also provided for aerosol capture, such as liquid hydrocarbon aerosol capture. In some cases, these systems, methods, and/or devices may be utilized in conjunction or as part of aspects of the methods, systems, and/or devices for liquid hydrocarbon fuel and/or hydrocarbon chemical production. An aerosol may include a gas or a mixture of gases that may have particles suspended within it. The particles may be liquid or solid or both, and the particles may include one or more chemical species. With changes in temperature, pressure, the composition of the non-aerosol environment, and/or with the passage of time, components of the gas in the aerosol may condense, coalesce and/or crystallize and may become a component of the particles portion of the aerosol. The act of gathering or capturing the aerosols may include collecting all or part of one or more of the components of the aerosol into a non-aerosol form. Embodiments may utilize an aerosol gathering chamber that may be configured to pass an aerosol through a material in a bulk liquid phase disposed within the aerosol gathering chamber to gather the aerosol. Different configurations of the aerosol gathering chamber may further facilitate the gathering of the aerosol, such as through increasing a path length through the bulk liquid phase material and/or an area of contact between the aerosol and the bulk liquid phase material. Some embodiments may also include the production of the aerosol and/or the distillation of the gathered components of the aerosol. The distilled gathered components of the aerosol may be utilized to augment the bulk liquid phase material in some cases.

A general overview of a system 300-*a* for aerosol capture in accordance with various embodiments is provided with FIG. 3A. System 300-*a* may include an aerosol gathering chamber 310. The specific component(s) shown are intended merely to be illustrative. Some embodiments may include other components, not necessarily shown, that may be utilized. Some, but not all, of these variants may be noted in the description that follows. In some embodiments, the aerosol capture chamber 310 may be an example of the liquid fuel and/or liquid solvent chamber 120 of FIG. 1B and/or FIG. 1C.

In some embodiments of system 300-*a*, the aerosol gathering chamber 310 may be configured to pass an aerosol through a material in a bulk liquid phase disposed within the aerosol gathering chamber to gather at least a portion of one or more components the aerosol. The gathered component(s) of the aerosol may include at least a component of a liquid hydrocarbon in some cases. In some cases, the liquid hydrocarbon may be a liquid hydrocarbon fuel. The gathered component(s) of the aerosol may include a hydrocarbon compound.

In some embodiments of system 300-*a*, the material in the bulk liquid phase may include a liquid hydrocarbon. In some cases, the liquid hydrocarbon may be a liquid hydrocarbon fuel. The material in the bulk liquid phase may include water. The material in the bulk liquid phase may be temperature-controlled in system 300-*a* in some cases.

System 300-*a* may include one or more lengths of tubing in a spiral configuration containing the material in the bulk liquid phase to increase a path length for the aerosol passing through the material in the bulk liquid phase. Some embodiments of system 300-*a* may include one or more augers disposed within the aerosol gathering chamber to increase a path length for the aerosol passing through the material in the bulk liquid phase. These aspects may be shown in other figures for example, such as FIG. 4D and/or FIG. 4E.

System 300-*a* may include one or more distilling systems coupled with the aerosol gathering chamber to distill all or part of the gathered component(s) of the aerosol. One or more couplers may be configured in system 300-*a* to couple one or more of the one or more distillers to the aerosol gathering chamber to augment the material in the bulk liquid phase with all or part of the distilled gathered aerosol component(s). These aspects may be shown in other figures for example, such as FIG. 3C.

Some embodiments of system 300-*a* may include a mesh of a solid material disposed within the aerosol gathering chamber 310 configured to increase the area of contact between the aerosol and the material in the bulk liquid phase and through which the aerosol and material in the bulk liquid phase are passed. Some embodiments of system 300-*a* may include multiple baffles disposed within the aerosol gathering chamber 310 configured to increase a path length through the material in the bulk liquid phase. Some embodiments of system 300-*a* may include a mesh of solid material disposed around multiple baffles within the aerosol gathering chamber 310, which may be configured to increase the area of contact between the aerosol and the material in the bulk liquid phase and through which the aerosol is passed. These aspects may be shown in other figures for example, such as FIG. 4B and/or FIG. 4C.

System 300-*a* may include one or more ports coupled with the aerosol gathering chamber 310 to allow removal of water or other liquids with a higher density than other gathered components of the aerosol and higher than the density of the material in the bulk liquid phase from the aerosol gathering chamber 310 in some cases. Some embodiments may include one or more ports coupled with the aerosol gathering chamber 310 to allow removal of a portion or all of the gathered aerosol component(s) and/or a portion or all of the material in the bulk liquid phase from the aerosol gathering chamber.

Some embodiments of system 300-*a* may include one or more aerosol production chambers coupled with the aerosol gathering chamber 310. In some cases, the one or more aerosol production chambers may include an aerosol production chamber producing at least a hydrocarbon compound. In some cases, the aerosol production chamber may utilize biomass to produce at least the hydrocarbon compound. In some cases, the aerosol production chamber may utilize municipal solid waste to produce at least the hydrocarbon compound. Merely by way of example, an aerosol production chamber may produce the aerosol utilizing a fast pyrolysis and/or flash pyrolysis process. Different techniques of pyrolysis, for example, may be utilized, including, but not limited to: bubbling fluidized bed, circulating fluidized beds and/or transport reactor, rotating cone pyrolyzer, ablative pyrolyzer, vacuum pyrolysis, auger reactor, and/or tube furnace.

Another general overview of a system 300-*b* for aerosol capture in accordance with various embodiments is provided with FIG. 3B. System 300-*b* may be an example of system 300-*a* of FIG. 3A. System 300-*b* may include a bulk liquid phase material chamber 310-*a*, which may be an example of the aerosol gathering chamber 310 of FIG. 3A. The bulk liquid phase material chamber 310-*a* may also be referred to as a liquid solvent or fuel chamber in some cases. System 300-*b* may also include an aerosol production chamber 305. In some embodiments, the aerosol production chamber 305 may be an example of the non-oxidation reaction chamber r110 of FIG. 1A, the pyrolysis reaction chamber 110-*a* of FIG. 1B, the pyrolysis reaction chamber 110-*b* of FIG. 1C, the tube furnace 110-*c* of FIG. 1D, the tube furnace 110-*d* of FIG. 1E, the system 200-*a* of FIG. 2A, and/or the system 200-*b* of FIG. 2B, for example. In some embodiments, the bulk liquid phase material chamber 310-*a* may be an example of the liquid fuel and/or liquid solvent chamber 120 of FIG. 1B and/or FIG. 1C and/or the aerosol capture chamber 310 of FIG. 3B. The specific component(s) shown are intended merely to be illustrative. Some embodiments may include other components, not necessarily shown, that may be utilized. Some, but not all of these variants, may be noted in the description that follows.

The aerosol production chamber 305 may be coupled with the bulk liquid phase material chamber 310-*a*. The aerosol production chamber 305 may be configured to produce at least a hydrocarbon compound that may be in an aerosol form that may be fed to the bulk liquid phase material chamber 310-*a*. In some cases, the aerosol production chamber 305 may utilize biomass to produce at least the hydrocarbon compound. In some cases, the aerosol production chamber 305 may utilize municipal solid waste to produce at least the hydrocarbon compound.

The aerosol produced in the aerosol production chamber 305 may be coupled with the bulk liquid phase material chamber 310-*a* such that the aerosol may pass through a material in a bulk liquid phase disposed within the bulk liquid phase material chamber 310-*a* to gather at least a portion of one or more components of the aerosol. The gathered aerosol component(s) may include at least a component of a liquid hydrocarbon in some cases. The gathered aerosol component(s) may include a hydrocarbon compound.

In some embodiments of system 300-*b*, the material in the bulk liquid phase may include a liquid hydrocarbon. The material in the bulk liquid phase may include water. The material in the bulk liquid phase may be temperature-controlled in system 300-*b* in some cases.

FIG. 3C shows a system 300-*c* for aerosol capture in accordance with various embodiments. System 300-*c* may be an example of system 300-*a* of FIG. 3A and/or system 300-*b* of FIG. 3B. System 300-*c* may include a hydrocarbon aerosol production chamber 305-*a*, which may be an example of the aerosol production chamber 305 of FIG. 3B. System 300-*c* may also include a bulk liquid hydrocarbon chamber 310-*b*, which may be an example of the aerosol gathering chamber 305 of FIG. 3A or the bulk liquid phase material chamber 305-*a* of FIG. 3B. System 300-*c* may also include a distiller 315. Distiller 315 may be an example of distiller 130 of FIG. 1B. The specific component(s) shown are intended merely to be illustrative. Some embodiments may include other components, not necessarily shown, that may be utilized. Some, but not all of these variants, may be noted in the description that follows.

System 300-*c* may utilize the distiller 315, which may be coupled with the bulk liquid hydrocarbon chamber 310-*b*, to distill all or part of the gathered aerosol component(s). The gathered aerosol components of this example may include a hydrocarbon aerosol produced through the hydrocarbon aerosol production chamber 305-*a*. In some embodiments, one or more couplers 320 may be configured in system 300-*c* to couple the distiller 315 back to the bulk liquid hydrocarbon chamber 310-*b* to augment the liquid hydrocarbon disposed in the bulk liquid hydrocarbon chamber 310-*b* with all or part of the distilled gathered aerosol components.

Figure 4A:
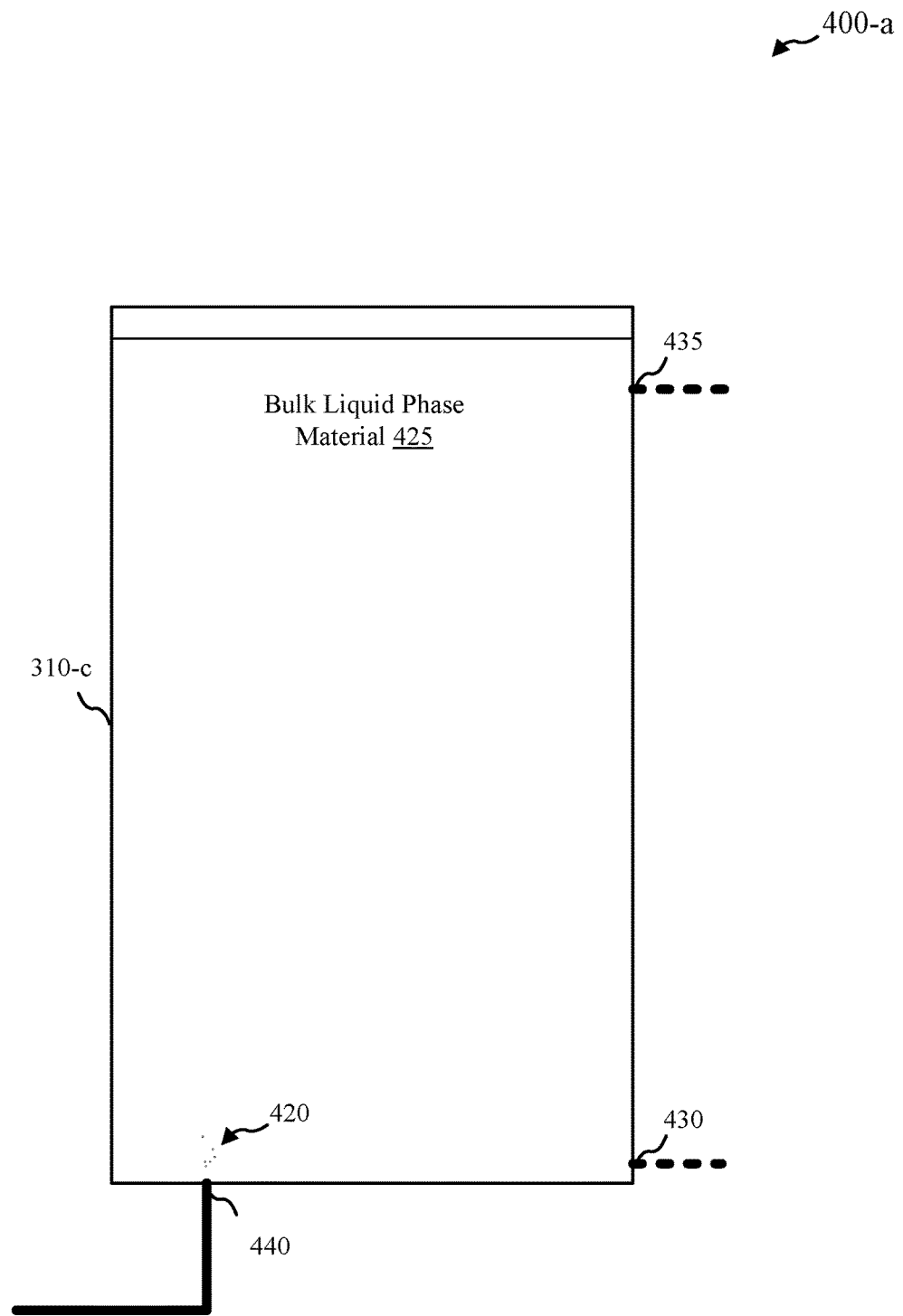

Turning now to FIG. 4A, a system 400-*a* for aerosol capture in accordance with various embodiments is provided. In some embodiments, system 400-*a* may be an example of aspects of system 300-*a* of FIG. 3A, system 300-*b* of FIG. 3B, and/or system 300-*c* of FIG. 3C. Specific component(s) shown are intended merely to be illustrative. Some embodiments may include other components, not necessarily shown, that may be utilized. Some, but not all of these variants, may be noted in the description that follows.

System 300-*a* may include an aerosol gathering chamber 310-*c* that may be configured to pass an aerosol 420 through a material in a bulk liquid phase 425 that may be disposed within the aerosol gathering chamber 310-*c* to gather at least a portion of one or more components of the aerosol 420. The gathered aerosol component(s) may include at least a component of a liquid hydrocarbon in some cases. The gathered aerosol component(s) may include a hydrocarbon compound.

In some embodiments of system 400-*a*, the material in the liquid phase 425 may include a bulk liquid hydrocarbon. The material in the bulk liquid phase 425 may include water. The material in the bulk liquid phase 425 may be temperature-controlled in the aerosol gathering chamber 310-*c* in some cases.

System 400-*a* may include one or more lower ports 430 that may be coupled with the aerosol gathering chamber 310-*c* to allow removal of water or other liquids with a higher density than other gathered components of the aerosol and higher than the density of the material in the bulk liquid phase from the aerosol gathering chamber 310-*c* in some cases. Some embodiments may include one or more upper ports 435 that may be coupled with the aerosol gathering chamber 310-*c* to allow removal of the gathered aerosol component(s) from the aerosol gathering chamber 310-*c*. System 400-*a* may include one or more ports 440 that may be coupled with the aerosol gathering chamber 310-*c* to allow for the introduction of the aerosol into the aerosol gathering chamber 310-*c*.

Figure 4B:
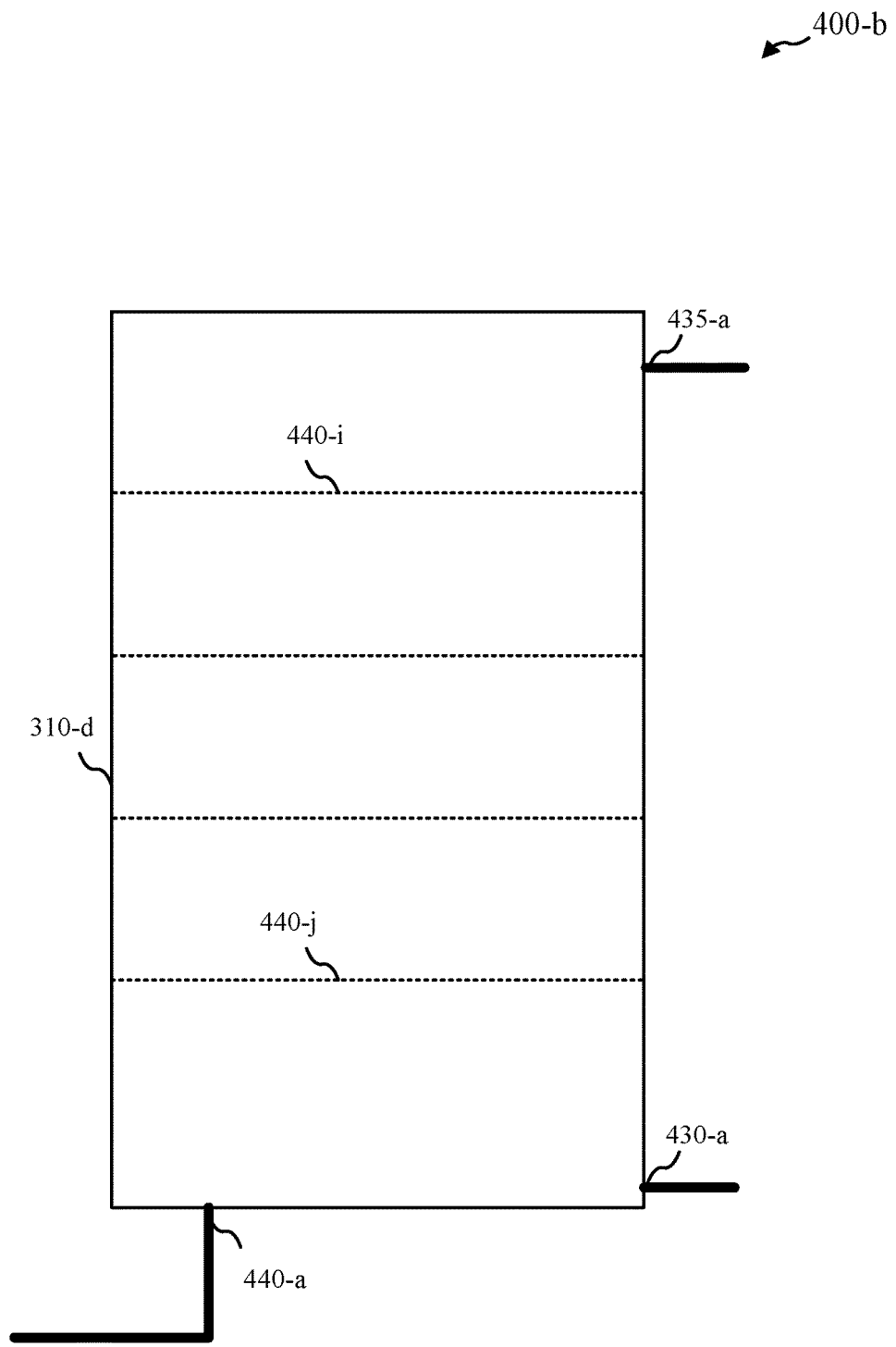

Turning now to FIG. 4B, a system 400-*b* for aerosol capture in accordance with various embodiments is provided. In some embodiments, system 400-*b* may be an example of aspects of system 300-*a* of FIG. 3A, system 300-*b* of FIG. 3B, system 300-*c* of FIG. 3C, and/or system 400-*a* of FIG. 4A. The specific component(s) shown are intended merely to be illustrative. Some embodiments may include other components, not necessarily shown, that may be utilized. Some, but not all of these variants, may be noted in the description that follows.

System 400-*b* may include an aerosol gathering chamber 310-*d* that may be configured to pass an aerosol through a material in a bulk liquid phase that may be disposed within the aerosol gathering chamber 310-*d* to gather some or all of one or more components of the aerosol. The gathered aerosol component(s) may include at least a component of a liquid hydrocarbon in some cases. The gathered aerosol component(s) may include a hydrocarbon compound.

In some embodiments of system 400-*b*, the material in the bulk liquid phase may include a liquid hydrocarbon. The material in the bulk liquid phase may include water. The material in the bulk liquid phase may be temperature-controlled in the aerosol gathering chamber 310-*d* in some cases.

System 400-*b* may include one or more lower ports 430-*a* that may be coupled with the aerosol gathering chamber 310-*d* to allow removal of water or other liquids with a higher density than other gathered components of the aerosol and higher than the density of the material in the bulk liquid phase from the aerosol gathering chamber 310-*d* in some cases. Some embodiments may include one or more upper ports 435-*a*, which may be coupled with the aerosol gathering chamber 310-*d* to allow removal of the gathered aerosol component(s) from the aerosol gathering chamber 310-*d*. System 400-*b* may include one or more ports 440-*a*, which may be coupled with the aerosol gathering chamber 310-*d* to allow for the introduction of the aerosol into the aerosol gathering chamber 310-*d*.

Some embodiments of system 400-*b* may include one or more meshes 440-*i*, 440-*j* of a solid material disposed within the aerosol gathering chamber 310-*d*. The mesh(es) 440 may be configured to increase the area of contact between the aerosol and the material in the bulk liquid phase and through which the aerosol and material in the bulk liquid phase are passed.

Figure 4C:
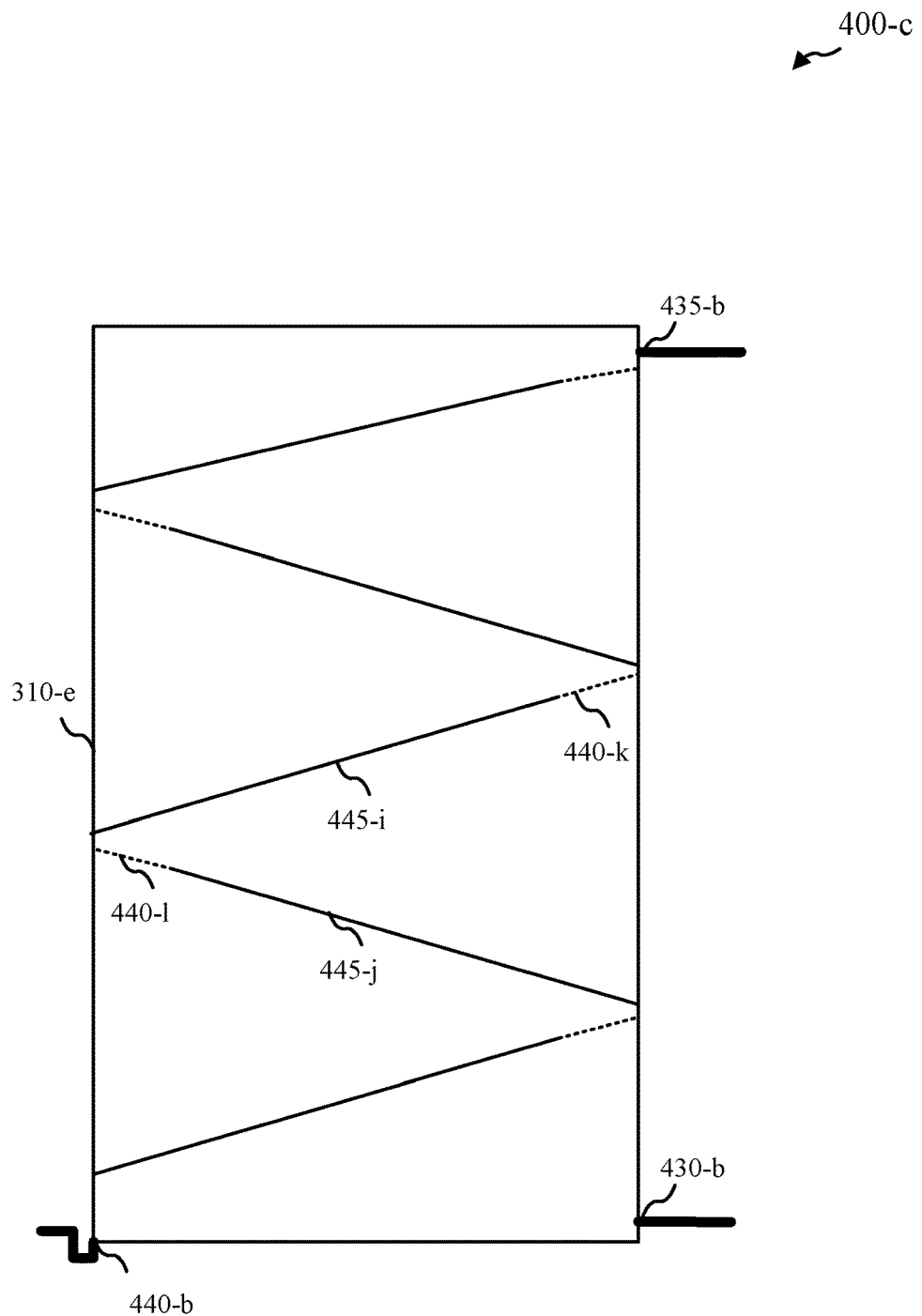

Turning now to FIG. 4C, a system 440-*c* for aerosol capture in accordance with various embodiments is provided. In some embodiments, system 440-*c* may be an example of aspects of system 300-*a* of FIG. 3A, system 300-*b* of FIG. 3B, system 300-*c* of FIG. 3C, system 400-*a* of FIG. 4A, and/or system 400-*b* of FIG. 4B. The specific component(s) shown are intended merely to be illustrative. Some embodiments may include other components, not necessarily shown, that may be utilized. Some, but not all of these variants, may be noted in the description that follows.

System 440-*c* may include an aerosol gathering chamber 310-*e* that may be configured to pass an aerosol through a material in a bulk liquid phase that may be disposed within the aerosol gathering chamber 310-*e* to gather at least a portion of one or more components of the aerosol. The gathered aerosol component(s) may include at least a component of a liquid hydrocarbon in some cases. The gathered aerosol component(s) may include a hydrocarbon compound.

In some embodiments of system 440-*c*, the material in the bulk liquid phase may include a liquid hydrocarbon. The material in the bulk liquid phase may include water. The material in the bulk liquid phase may be temperature-controlled in the aerosol gathering chamber 310-*e* in some cases.

System 440-*c* may include one or more lower ports 430-*b* that may be coupled with the aerosol gathering chamber 310-*e* to allow removal of water or other liquids with a higher density than other gathered components of the aerosol and higher than the density of the material in the bulk liquid phase from the aerosol gathering chamber 310-*e* in some cases. Some embodiments may include one or more upper ports 435-*b* that may be coupled with the aerosol gathering chamber 310-*e* to allow removal of the gathered aerosol component(s) from the aerosol gathering chamber 310-*e*. System 440-*c* may include one or more ports 440-*b* that may be coupled with the aerosol gathering chamber 310-*e* to allow for the introduction of the aerosol into the aerosol gathering chamber 310-*e*.

Some embodiments of system 440-*c* may include one or more meshes 440-*k*, 440-*l* of a solid material disposed within the aerosol gathering chamber 310-*e*. The mesh(es) 440 may be configured to increase the area of contact between the aerosol and the material in the bulk liquid phase and through which the aerosol and material in the bulk liquid phase are passed. Some embodiments of system 440-*c* may include one or more baffles 445-*i*, 445-*j* disposed within the aerosol gathering chamber 310-*e* configured to increase a path length through the material in the bulk liquid phase. Some embodiments of system 440-*c* may include the mesh 440-*k*, 440-*l* of solid material disposed around multiple baffles 445-*i*, 445-*j* within the aerosol gathering chamber 310-*e* configured to increase the area of contact between the aerosol and the material in the bulk liquid phase and through which the aerosol and material in the bulk liquid phase are passed.

Figure 4D:
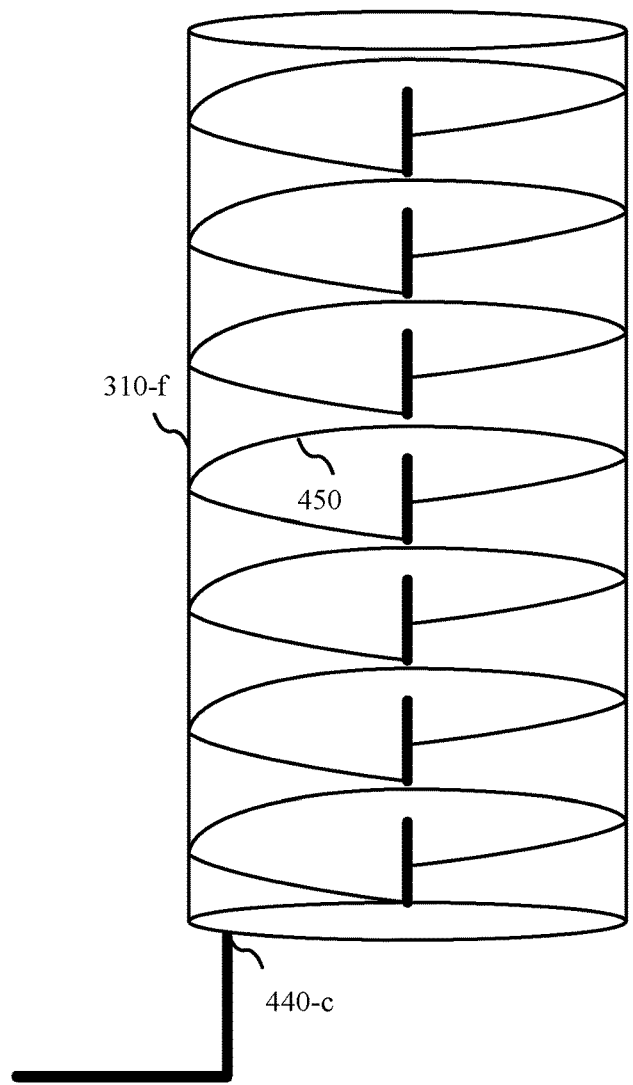

Turning now to FIG. 4D, a system 400-*d* for aerosol capture in accordance with various embodiments is provided. In some embodiments, system 400-*d* may be an example of aspects of system 300-*a* of FIG. 3A, system 300-*b* of FIG. 3B, system 300-*c* of FIG. 3C, system 400-*a* of FIG. 4A, system 400-*b* of FIG. 4B, and/or system 440-*c* of FIG. 4C. The specific component(s) shown are intended merely to be illustrative. Some embodiments may include other components, not necessarily shown, that may be utilized. Some, but not all of these variants, may be noted in the description that follows.

System 400-*d* may include an aerosol gathering chamber 310-*f* that may be configured to pass an aerosol through a material in a bulk liquid phase that may be disposed within the aerosol gathering chamber 410-*f* to gather at least a portion of one or more components of the aerosol. The gathered aerosol component(s) may include at least a component of a liquid hydrocarbon in some cases. The gathered aerosol component(s) may include a hydrocarbon compound.

In some embodiments of system 400-*d*, the material in the bulk liquid phase may include a liquid hydrocarbon. The material in the bulk liquid phase may include water. The material in the bulk liquid phase may be temperature-controlled in the aerosol gathering chamber 310-*f* in some cases.

Some embodiments of system 400-*d* may include one or more augers 450 disposed within the aerosol gathering chamber 310-*f* to increase a path length through the material in the bulk liquid phase. System 400-*d* may include one or more ports 440-*c* that may be coupled with the aerosol gathering chamber 310-*f* to allow for the introduction of the aerosol into the aerosol gathering chamber 310-*f*. Other input and/or output ports (not shown) may also be utilized as described with respect to systems 400-*a* of FIG. 4A, system 400-*b* of FIG. 4B, and/or system 440-*c* of FIG. 4C.

Figure 4E:
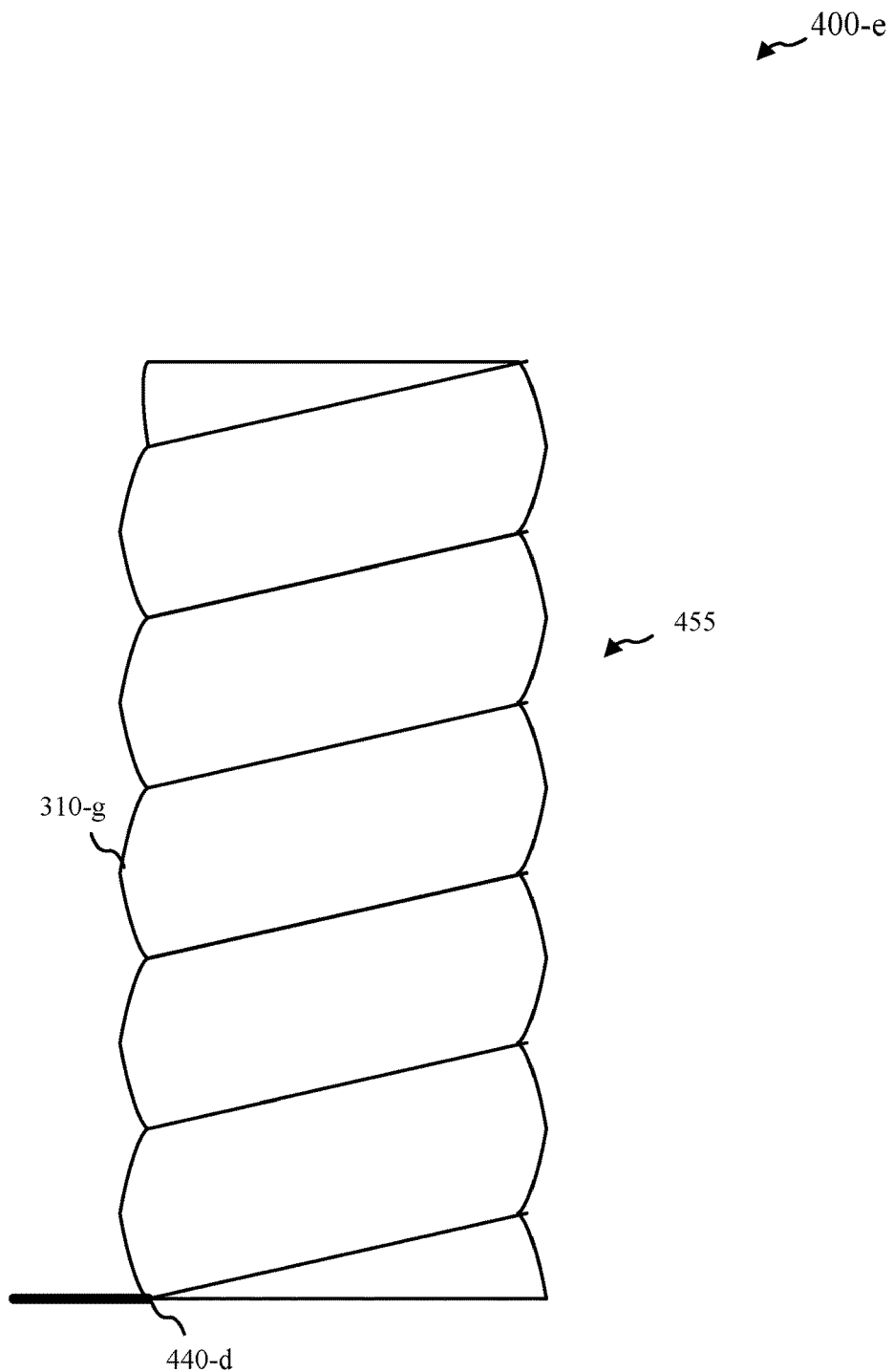

Turning now to FIG. 4E, a system 400-*e* for aerosol capture in accordance with various embodiments is provided. In some embodiments, system 400-*e* may be an example of aspects of system 300-*a* of FIG. 3A, system 300-*b* of FIG. 3B, system 300-*c* of FIG. 3C, system 400-*a* of FIG. 4A, system 400-*b* of FIG. 4B, system 440-*c* of FIG. 4C, and/or system 400-*d* of FIG. 4D. The specific component(s) shown are intended merely to be illustrative. Some embodiments may include other components, not necessarily shown, that may be utilized. Some, but not all of these variants, may be noted in the description that follows.

System 400-*e* may include an aerosol gathering chamber 310-*g* that may be configured to pass an aerosol through a material in a bulk liquid phase that may be disposed within the aerosol gathering chamber 310-*g* to gather at least a portion of one or more components of the aerosol. The gathered aerosol component(s) may include at least a component of a bulk liquid hydrocarbon in some cases. The gathered aerosol component(s) may include a hydrocarbon compound.

In some embodiments of system 400-*e*, the material in the bulk liquid phase may include a liquid hydrocarbon. The material in the bulk liquid phase may include water. The material in the bulk liquid phase may be temperature-controlled in the aerosol gathering chamber 410-*g* in some cases.

System 400-*e* may include one or more lengths of tubing in a spiral configuration 455 containing the material in the bulk liquid phase to increase a path length through the material in the bulk liquid phase. System 400-*e* may include one or more ports 440-*e* that may be coupled with the aerosol gathering chamber 310-*g* to allow for the introduction of the aerosol into the aerosol gathering chamber 310-*g*. Other input and/or output ports (not shown) may also be utilized as described with respect to systems 400-*a* of FIG. 4A, system 400-*b* of FIG. 4B, and/or system 440-*c* of FIG. 4C.

FIG. 5A provides an overview of a flowchart of a method 500-*a* of liquid hydrocarbon fuel production or hydrocarbon chemical production in accordance with various embodiments. Method 500-*a* may be implemented utilizing aspects of system 100-*a* of FIG. 1, system 100-*b* of FIG. 1B, system 100-*c* of FIG. 1C, system 100-*d* of FIG. 1D, system 100-*e* of FIG. 1E, system 200-*a* of FIG. 2A, system 200-*b* of FIG. 2B, system 300-*a* of FIG. 3A, system 300-*b* of FIG. 3B, system 300-*c* of FIG. 3C, system 400-*a* of FIG. 4A, system 400-*b* of FIG. 4B, system 440-*c* of FIG. 4C, system 400-*d* of FIG. 4D, and/or system 400-*e* of FIG. 4E, for example. In FIG. 5A, the specific selection of steps shown and the order in which they are shown is intended merely to be illustrative. It is possible for certain steps to be performed in alternative orders, for certain steps to be omitted, and for certain additional steps to be added according to different embodiments of the invention. Some but not all of these variants are noted in the description that follows. In some embodiments, the production of method 500-*a* may be referred to as direct production.

At block 510, a carbon-oxygen-hydrogen (C—O—H) compound, or material containing a C—O—H compound, may be heated to a temperature of at least 800 degrees Celsius such that the C—O—H compound reacts through a non-oxidation reaction to generate or produce at least a hydrocarbon compound that may be at least a component of a liquid hydrocarbon fuel or a hydrocarbon chemical. In some cases, the liquid hydrocarbon fuel is a liquid when at a temperature of 20 degrees Celsius. The non-oxidation reaction may include a pyrolysis reaction. The non-oxidation reaction may include a hydrous pyrolysis reaction. Some embodiments may include directly distilling the liquid hydrocarbon fuel.

In some embodiments of method 500-*a*, the hydrocarbon compound produced through the non-oxidation reaction includes a hydrocarbon aerosol form as the hydrocarbon compound at least as it is produced or cools. Some embodiments may include passing the hydrocarbon aerosol form through a material in a liquid phase in order to gather the aerosol material. The material in the liquid phase may include a hydrocarbon fuel. Passing the hydrocarbon aerosol through the material in the liquid phase may include passing the hydrocarbon aerosol form through a mesh. In some cases, the hydrocarbon aerosol may include naphthalene.

In some embodiments in method 500-*a*, the non-oxidation reaction may generate a hydrocarbon aerosol. Some embodiments may include passing the hydrocarbon aerosol through a liquid fuel. Passing the hydrocarbon aerosol the liquid fuel may include passing the hydrocarbon aerosol through a mesh. This may facilitate reduce the size of bubbles of the hydrocarbon aerosol. In some cases, the hydrocarbon aerosol may include naphthalene.

Some embodiments of method 500-*a* may include mixing the liquid hydrocarbon fuel with at least another liquid fuel. The liquid hydrocarbon fuel and/or the other liquid fuel may include, but are not limited to, at least gasoline, diesel, or aviation fuel. The C—O—H compound may include at least biomass. In some cases, the material containing C—O—H compound may be in a solid phase.

In some embodiments of method 500-*a*, C—O—H compound may have a different residence time. For example, in some embodiments, the residence time may be at least: 1 second, 10 seconds, 100 seconds, 300 seconds, and/or 1000 seconds. In some embodiments of method 500-*a*, the temperature may be at least 900 degrees Celsius or 1100 degrees Celsius at block 510.

In some embodiments of method 500-*a*, the liquid hydrocarbon fuel may have an energy content of at least 16,000 BTU/lb or 37,000 kJ/kg. In some cases, the energy content may be at least 20,000 BTU/lb or 46,000 kJ/kg.

In some embodiments of method 500-*a*, the C—O—H compound or the material containing the C—O—H compound includes the C—O—H compound mixed with at least water. Thus, the C—O—H compound may be mixed with at least water in some cases. Heating the C—O—H compound or the material containing the C—O—H compound may include reacting the mixed water as well as any water in the original C—O—H compound with the C—O—H compound to generate the hydrocarbon fuel in at least a liquid aerosol state or vapor state. Some embodiments of method 500-*a* may include transferring the C—O—H compound mixed with water to a reaction chamber before reacting the mixed water as well as any water in the original C—O—H compound with the C—O—H compound to generate or produce the liquid hydrocarbon fuel or hydrocarbon chemical, which may be in at least a liquid aerosol state or vapor state.

Some embodiments of method 500-*a* may utilize a C—O—H compound that includes a wet C—O—H compound, though the C—O—H compound may be dry in some cases. Heating the C—O—H compound may include reacting water that is part of the wet C—O—H compound with the C—O—H compound to generate the liquid hydrocarbon fuel. Some embodiments of method 500-*a* may include transferring the wet C—O—H compound to a reaction chamber before heating the wet C—O—H compound.

In some embodiments of method 500-*a*, the non-oxidation reaction is performed within a tube furnace. The tube furnace may include a material composition that may include at least a high-nickel metal alloy. Some embodiments may include using an auger to effect continuous motion of the material containing the C—O—H compound into and through the tube furnace. The material containing the C—O—H compound may be in a solid phase in some cases. The auger may include a material composition that may include at least a high-nickel metal alloy.

Some embodiments of method 500-*a* may use an auger that includes multiple different pitches between multiple blades, though some embodiments may utilize a single uniform blade pitch. The auger may include a material composition that includes at least a high-nickel metal alloy to effect continuous motion of the material containing the C—O—H compound into and through a tube furnace whose material composition may include at least a high-nickel metal alloy. The material containing the C—O—H compound may be in a solid phase in some cases.

Figure 5B:
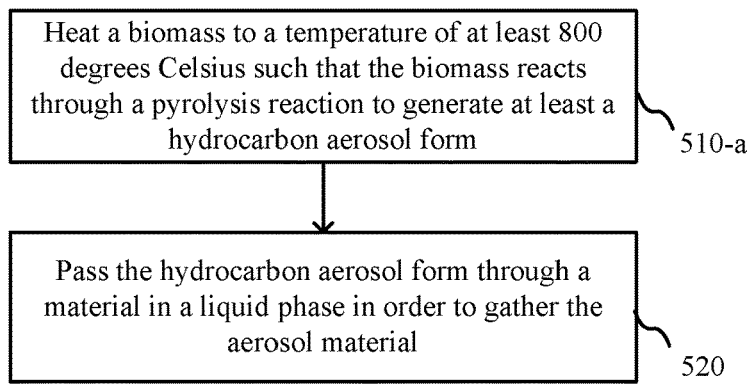

FIG. 5B provides an overview of a flowchart of a method 500-*b* of direct liquid hydrocarbon fuel production or hydrocarbon chemical production in accordance with various embodiments. Method 500-*b* may be implemented utilizing aspects of system 100-*a* of FIG. 1, system 100-*b* of FIG. 1B, system 100-*c* of FIG. 1C, system 100-*d* of FIG. 1D, system 100-*e* of FIG. 1E, system 200-*a* of FIG. 2A, system 200-*b* of FIG. 2B, system 300-*a* of FIG. 3A, system 300-*b* of FIG. 3B, system 300-*c* of FIG. 3C, system 400-*a* of FIG. 4A, system 400-*b* of FIG. 4B, system 440-*c* of FIG. 4C, system 400-*d* of FIG. 4D, and/or system 400-*e* of FIG. 4E, for example. In FIG. 5B, the specific selection of steps shown and the order in which they are shown is intended merely to be illustrative. It is possible for certain steps to be performed in alternative orders, for certain steps to be omitted, and for certain additional steps to be added according to different embodiments of the invention. Some but not all of these variants are noted in the description that follows. Method 500-*b* may be an example of method 500-*a* of FIG. 5A.

At block 510-*a*, biomass may be heated to a temperature of at least 800 degrees Celsius such that the biomass reacts through a pyrolysis reaction to generate at least a hydrocarbon aerosol or a hydrocarbon chemical. At block 520, the hydrocarbon aerosol may be passed through a material in a liquid phase in order to gather the aerosol material. For example, the aerosol may be bubbled through a hydrocarbon liquid fuel to generate another liquid hydrocarbon fuel. In some cases, a mesh may be placed within liquid phase material in some cases through which the aerosol may pass.

FIG. 5C provides an overview of a flow chart of a method 500-*c* of direct liquid hydrocarbon fuel production or hydrocarbon chemical production in accordance with various embodiments. Method 500-*c* may be implemented utilizing aspects of system 100-*a* of FIG. 1, system 100-*b* of FIG. 1B, system 100-*c* of FIG. 1C, system 100-*d* of FIG. 1D, system 100-*e* of FIG. 1E, system 200-*a* of FIG. 2A, system 200-*b* of FIG. 2B, system 300-*a* of FIG. 3A, system 300-*b* of FIG. 3B, system 300-*c* of FIG. 3C, system 400-*a* of FIG. 4A, system 400-*b* of FIG. 4B, system 440-*c* of FIG. 4C, system 400-*d* of FIG. 4D, and/or system 400-*e* of FIG. 4E, for example. In FIG. 5C, the specific selection of steps shown and the order in which they are shown is intended merely to be illustrative. It is possible for certain steps to be performed in alternative orders, for certain steps to be omitted, and for certain additional steps to be added according to different embodiments of the invention. Some but not all of these variants are noted in the description that follows. Method 500-*c* may be an example of method 500-*a* of FIG. 5A.

At block 505, a biomass may be mixed with water to generate a wet biomass. At block 515, the wet biomass may be transferred to a non-oxidation reaction chamber. At block 510-*b*, the wet biomass may be heated such that the mixed water as well as any water in the original biomass react with the biomass to generate a hydrocarbon fuel in at least a liquid aerosol or vapor state. At block 525, the hydrocarbon fuel may be distilled directly from the liquid aerosol or vapor state. For example, the hydrocarbon fuel may not be run through one or more catalysts in some cases.

Figure 5D:
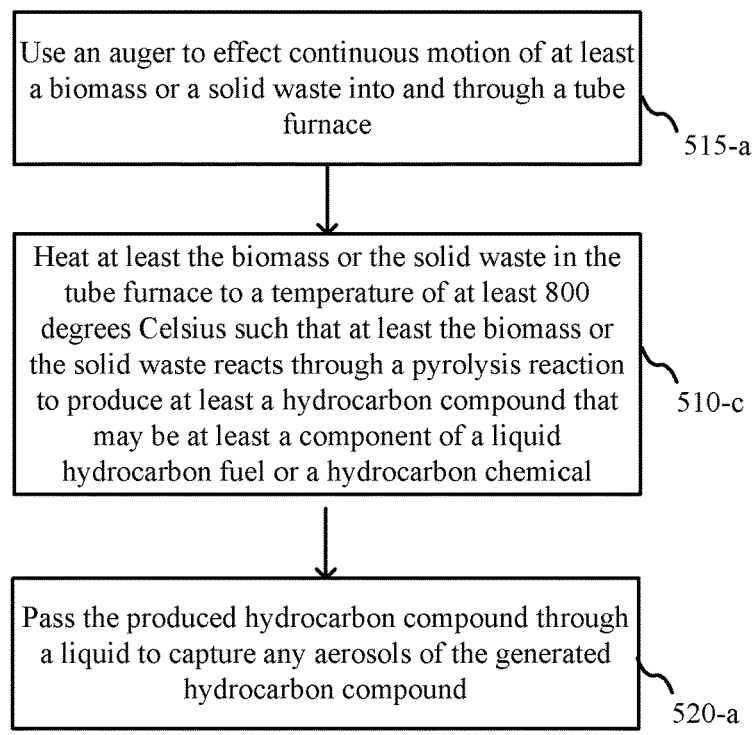

FIG. 5D provides an overview of a flowchart of a method 500-*d* of liquid hydrocarbon fuel production or hydrocarbon chemical production in accordance with various embodiments. Method 500-*d* may be implemented utilizing aspects of system 100-*a* of FIG. 1A, system 100-*b* of FIG. 1B, system 100-*c* of FIG. 1C, system 100-*d* of FIG. 1D, system 200-*a* of FIG. 2A, system 200-*b* of FIG. 2B, system 300-*a* of FIG. 3A, system 300-*b* of FIG. 3B, system 300-*c* of FIG. 3C, system 400-*a* of FIG. 4A, system 400-*b* of FIG. 4B, system 440-*c* of FIG. 4C, system 400-*d* of FIG. 4D, and/or system 400-*e* of FIG. 4E, for example. In FIG. 5D, the specific selection of steps shown and the order in which they are shown is intended merely to be illustrative. It is possible for certain steps to be performed in alternative orders, for certain steps to be omitted, and for certain additional steps to be added according to different embodiments of the invention. Some but not all of these variants are noted in the description that follows. Method 500-*d* may be an example of aspects of method 500-*a* of FIG. 5A.

At block 515-*a*, an auger may be used to effect continuous motion of at least a biomass or a solid waste into and through a tube furnace. At block 510-*c*, at least the biomass or the solid waste may be heated in the tube furnace to a temperature of at least 800 degrees Celsius such that at least the biomass or the solid waste reacts through a pyrolysis reaction to produce at least a hydrocarbon compound that may be at least a component of a liquid hydrocarbon fuel or hydrocarbon chemical (some embodiments may utilize temperatures of at least 900 degrees Celsius or at least 1100 degrees Celsius). In some cases, the liquid hydrocarbon fuel is a liquid when at a temperature of 20 degrees Celsius. At block 520-*a*, the produced hydrocarbon compound may be passed through a liquid to capture any aerosols of the produced hydrocarbon compound.

In some embodiments of method 500-*d*, the tube furnace may include a material composition that may include at least a high-nickel metal alloy, such as a high-nickel steel alloy. The biomass may be in a solid phase in some cases. The auger may include a material composition that may include at least a high-nickel metal alloy, such as a high-nickel steel alloy. The auger may include multiple different pitches between multiple blades, though some embodiments may utilize a single uniform blade pitch.

Figure 5E:
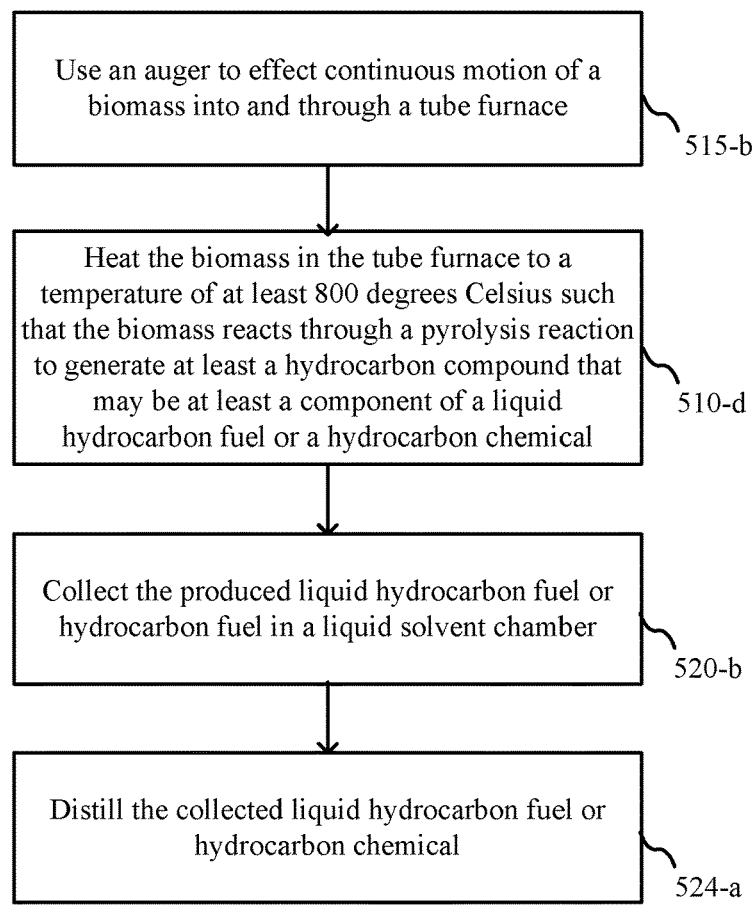

FIG. 5E provides an overview of a flowchart of a method 500-*e* of liquid hydrocarbon fuel production or hydrocarbon chemical production in accordance with various embodiments. Method 500-*e* may be implemented utilizing aspects of system 100-*a* of FIG. 1A, system 100-*b* of FIG. 1B, system 100-*c* of FIG. 1C, system 100-*d* of FIG. 1D, system 100-*e* of FIG. 1D, system 200-*a* of FIG. 2A, system 200-*b* of FIG. 2B, system 300-*a* of FIG. 3A, system 300-*b* of FIG. 3B, system 300-*c* of FIG. 3C, system 400-*a* of FIG. 4A, system 400-*b* of FIG. 4B, system 440-*c* of FIG. 4C, system 400-*d* of FIG. 4D, and/or system 400-*e* of FIG. 4E, for example. In FIG. 5E, the specific selection of steps shown and the order in which they are shown are intended merely to be illustrative. It is possible for certain steps to be performed in alternative orders, for certain steps to be omitted, and for certain additional steps to be added according to different embodiments of the invention. Some but not all of these variants are noted in the description that follows. Method 500-*e* may be an example of aspects of method 500-*a* of FIG. 5A and/or method 500-*e* of FIG. 5E.

At block 515-*b*, an auger may be used to effect continuous motion of a biomass into and through a tube furnace. At block 510-*d*, the biomass may be heated in the tube furnace to a temperature of at least 800 degrees Celsius such that the biomass reacts through a pyrolysis reaction to produce at least a hydrocarbon compound that may be at least a component of a liquid hydrocarbon fuel or a hydrocarbon chemical (some embodiments may utilize temperatures of at least 900 degrees Celsius or at least 1100 degrees Celsius). In some cases, the liquid hydrocarbon fuel is a liquid when at a temperature of 20 degrees Celsius. At block 520-*b*, the produced liquid hydrocarbon fuel may be collected in a liquid solvent chamber. At block 524-*a*, the collected liquid hydrocarbon fuel may be distilled.

Figure 5F:
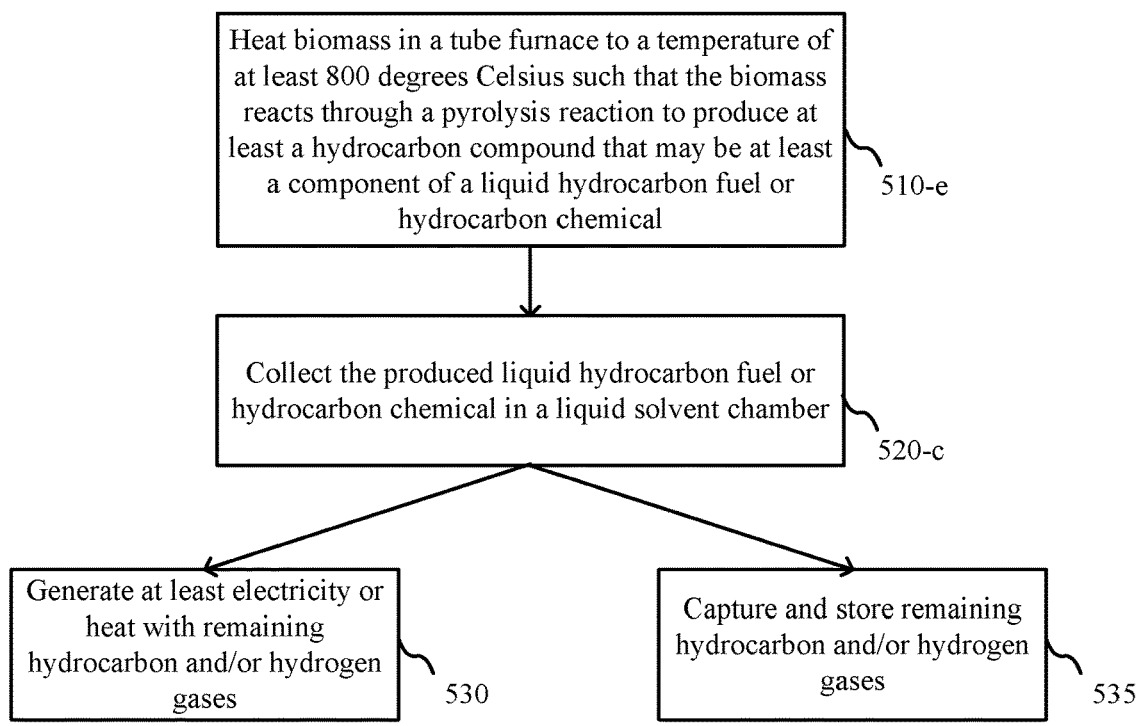

FIG. 5F provides an overview of a flowchart of a method 500-F of liquid hydrocarbon fuel production or hydrocarbon chemical production in accordance with various embodiments. Method 500-*g* may be implemented utilizing aspects of system 100-*a* of FIG. 1A, system 100-*b* of FIG. 1B, system 100-*c* of FIG. 1C, system 100-*d* of FIG. 1D, system 200-*a* of FIG. 2A, system 200-*b* of FIG. 2B, system 300-*a* of FIG. 3A, system 300-*b* of FIG. 3B, system 300-*c* of FIG. 3C, system 400-*a* of FIG. 4A, system 400-*b* of FIG. 4B, system 440-*c* of FIG. 4C, system 400-*d* of FIG. 4D, and/or system 400-*e* of FIG. 4E, for example. In FIG. 5F, the specific selection of steps shown and the order in which they are shown is intended merely to be illustrative. It is possible for certain steps to be performed in alternative orders, for certain steps to be omitted, and for certain additional steps to be added according to different embodiments of the invention. Some but not all of these variants are noted in the description that follows. Method 500-*f* may be an example of aspects of method 500-*a* of FIG. 5A.

At block 510-*e*, a biomass may be heated in the tube furnace to a temperature of at least 800 degrees Celsius such that the biomass reacts through a pyrolysis reaction to produce at least a hydrocarbon compound that may be at least a component of a liquid hydrocarbon fuel or a hydrocarbon chemical (some embodiments may utilize temperatures of at least 900 degrees Celsius or at least 1100 degrees Celsius). In some cases, the liquid hydrocarbon fuel is a liquid when at a temperature of 20 degrees Celsius. At block 520-*c*, the produced liquid hydrocarbon fuel may be collected in a liquid solvent chamber. Some embodiments may include a block 530 where electricity and/or heat may be generated utilizing remaining hydrocarbon and/or hydrogen gases. Some embodiments may include a block 535 where remaining hydrocarbon and/or hydrogen gases may be captured and stored.

FIG. 6A provides an overview of a flowchart of a method 600-*a* of aerosol capture in accordance with various embodiments. Method 600-*a* may be implemented utilizing aspects of system 100-*a* of FIG. 1A, system 100-*b* of FIG. 1B, system 100-*c* of FIG. 1C, system 100-*c* of FIG. 1D, system 100-*e* of FIG. 1E, system 200-*a* of FIG. 2A, system 200-*b* of FIG. 2B, system 300-*a* of FIG. 3A, system 300-*b* of FIG. 3B, system 300-*c* of FIG. 3C, system 400-*a* of FIG. 4A, system 400-*b* of FIG. 4B, system 440-*c* of FIG. 4C, system 400-*d* of FIG. 4D, and/or system 400-*e* of FIG. 4E, for example. In FIG. 6A, the specific selection of steps shown and the order in which they are shown is intended merely to be illustrative. It is possible for certain steps to be performed in alternative orders, for certain steps to be omitted, and for certain additional steps to be added according to different embodiments of the invention. Some but not all of these variants are noted in the description that follows.

At block 610, an aerosol may be passed through a material in a bulk liquid phase to gather at least a portion of one or more components of the aerosol. In some embodiments, the gathered aerosol component(s) may include at least a component of a liquid hydrocarbon, which may include a hydrocarbon fuel. The gathered aerosol component(s) may include a hydrocarbon compound in some cases.

In some embodiments of method 600-*a*, the material in the bulk liquid phase may include a liquid hydrocarbon. The material in the bulk liquid phase may include water in some cases. The material in the bulk liquid phase may be temperature-controlled.

The material in the bulk liquid phase may be disposed within a spiral tubing configuration. The material in the bulk liquid phase may be disposed within an auger.

Some embodiments of method 600-*a* may include distilling the gathered aerosol. The material in the bulk liquid phase may be augmented with all or part of the distilled gathered aerosol.

In some embodiments of method 600-*a*, passing the aerosol through the material in the bulk liquid phase further includes passing the aerosol through a mesh of solid material disposed within the material in the bulk liquid phase. In some embodiments, passing the aerosol through the material in the bulk liquid phase may further include passing the aerosol through the material in the bulk liquid phase with respect to multiple baffles disposed within the material in the bulk liquid phase. Passing the aerosol through the material in the bulk liquid phase may further include passing the aerosol through the material in the bulk liquid phase through a mesh of solid material disposed around the multiple baffles disposed within the material in the bulk liquid phase.

Some embodiments of method 600-*a* include removing water or other liquids with respect to the remainder of the material in the bulk liquid phase. In some embodiments, the water may be immiscible with the remainder of the material in the bulk liquid phase. In some embodiments, the water may be immiscible with and gravimetrically separable from the remainder of the material in the bulk liquid phase.

Some embodiments of method 600-*a* may include producing the aerosol. The aerosol may include at least a hydrocarbon compound or a component of a liquid hydrocarbon. The aerosol that includes at least the hydrocarbon compound or the component of the liquid hydrocarbon may be produced from biomass. The hydrocarbon compound or the component of the liquid hydrocarbon may include at least a hydrocarbon fuel or a hydrocarbon chemical.

FIG. 6B provides an overview of a flowchart of a method 600-*b* of aerosol capture in accordance with various embodiments. Method 600-*b* may be implemented utilizing aspects of system 100-*a* of FIG. 1A, system 100-*b* of FIG. 1B, system 100-*c* of FIG. 1C, system 100-*c* of FIG. 1D, system 100-*e* of FIG. 1E, system 200-*a* of FIG. 2A, system 200-*b* of FIG. 2B, system 300-*a* of FIG. 3A, system 300-*b* of FIG. 3B, system 300-*c* of FIG. 3C, system 400-*a* of FIG. 4A, system 400-*b* of FIG. 4B, system 440-*c* of FIG. 4C, system 400-*d* of FIG. 4D, and/or system 400-*e* of FIG. 4E, for example. In FIG. 6B, the specific selection of steps shown and the order in which they are shown is intended merely to be illustrative. It is possible for certain steps to be performed in alternative orders, for certain steps to be omitted, and for certain additional steps to be added according to different embodiments of the invention. Some but not all of these variants are noted in the description that follows. Method 600-*b* may be an example of aspects of method 600-*a* of FIG. 6A.

At block 605, a hydrocarbon aerosol may be produced. The hydrocarbon aerosol may be produced from biomass. At block 610-*a*, a hydrocarbon aerosol may be passed through a bulk liquid hydrocarbon to gather at least a portion of one or more components of the hydrocarbon aerosol. At block 615, the gathered hydrocarbon aerosol component(s) may be distilled. In some cases, the bulk liquid hydrocarbon may be augmented with all or part of the distilled gathered hydrocarbon aerosol component(s) as shown in block 620.

The bulk liquid hydrocarbon may be disposed within a spiral tubing configuration. The bulk liquid hydrocarbon may be disposed within an auger.

In some embodiments of method 600-*b*, passing the hydrocarbon aerosol through the bulk liquid hydrocarbon further includes passing the hydrocarbon aerosol through a mesh of solid material disposed within the bulk liquid hydrocarbon. In some embodiments, passing the hydrocarbon aerosol through the bulk liquid hydrocarbon may further include passing the hydrocarbon aerosol through the bulk liquid hydrocarbon with respect to multiple baffles disposed within the bulk liquid hydrocarbon. Passing the hydrocarbon aerosol through the bulk liquid hydrocarbon may further include passing the hydrocarbon aerosol through the bulk liquid hydrocarbon through a mesh of solid material disposed around the multiple baffles disposed within the bulk liquid hydrocarbon.

Some embodiments of method 600-*b* include removing water or other liquids with respect to the remainder of the bulk liquid hydrocarbon. In some embodiments, the water may be immiscible with the remainder of the bulk liquid hydrocarbon. In some embodiments, the water may be immiscible with and gravimetrically separable from the remainder of bulk liquid hydrocarbon.

While detailed descriptions of one or more embodiments have been given above, various alternatives, modifications, and equivalents will be apparent to those skilled in the art without varying from the spirit of the different embodiments. Moreover, except where clearly inappropriate or otherwise expressly noted, it should be assumed that the features, devices, and/or components of different embodiments may be substituted and/or combined. Thus, the above description should not be taken as limiting the scope of the different embodiments, which may be defined by the appended claims.

What is claimed is:

1. A method of direct liquid hydrocarbon fuel production comprising:

heating a carbon-oxygen-hydrogen (C—O—H) compound to a temperature of at least 800 degrees Celsius such that the C—O—H compound reacts through a non-oxidation reaction to generate at least a hydrocarbon aerosol that is at least a component of a liquid hydrocarbon fuel, wherein the C—O—H compound has a residence time of at least 100 seconds, and passing the hydrocarbon aerosol through a liquid fuel to gather the hydrocarbon aerosol and to form the liquid hydrocarbon fuel, wherein the liquid fuel includes at least gasoline, diesel, or aviation fuel.

2. The method of claim 1, wherein the non-oxidation reaction comprises a pyrolysis reaction.

3. The method of claim 1, wherein the C—O—H compound includes at least a biomass or a waste stream.

4. The method of claim 1, wherein the temperature is to at least 900 degrees Celsius.

5. The method of claim 1, wherein the C—O—H compound has a residence time less than 1,000 seconds.

6. The method of claim 1, wherein the hydrocarbon aerosol includes naphthalene.

7. The method of claim 1, further comprising removing water from the liquid hydrocarbon fuel.

8. The method of claim 7, further comprising distilling the liquid hydrocarbon fuel.

9. The method of claim 8, further comprising augmenting the liquid fuel with at least a portion of the distilled liquid hydrocarbon fuel.

10. A system for direct production of a liquid hydrocarbon fuel comprising:
   a non-oxidation reaction chamber configured to heat a carbon-oxygen-hydrogen (C—O—H) compound to a temperature of at least 800 degrees Celsius such that the C—O—H compound reacts through a non-oxidation reaction to produce at least a hydrocarbon aerosol that is at least a component of the liquid hydrocarbon fuel, wherein the non-oxidation reaction chamber is configured such the C—O—H compound has a residence time of at least 100 seconds;
   an aerosol gathering chamber coupled with the non-oxidation reaction chamber such that the hydrocarbon aerosol passes through a material in a liquid phase disposed within the aerosol gathering chamber to gather the hydrocarbon aerosol and to produce the liquid hydrocarbon fuel; and
   the material in the liquid phase disposed within the aerosol gathering chamber, wherein the material in the liquid phase includes at least gasoline, diesel, or aviation fuel.

11. The system of claim 10, wherein the non-oxidation reaction comprises a pyrolysis reaction.

12. The system of claim 10, wherein the non-oxidation reaction chamber comprises a tube furnace.

13. The system of claim 12, wherein the tube furnace includes a material composition that includes at least a high-nickel metal alloy.

14. The system of claim 12, further comprising an auger configured to effect continuous motion of material containing the C—O—H compound into and through the tube furnace.

15. The system of claim 10, wherein the temperature is to at least 900 degrees Celsius.

16. The system of claim 10, wherein the C—O—H compound comprises at least a biomass or a waste stream.

17. The system of claim 10, further comprising a distiller coupled with the aerosol gathering chamber, wherein the distiller is configured to distill the liquid hydrocarbon fuel.

18. The system of claim 17, wherein the distiller is coupled with the aerosol gathering chamber such at least a portion of the distilled liquid hydrocarbon fuel augments the material in the liquid phase disposed within the aerosol gathering chamber.

* * * * *